US009223160B2

(12) United States Patent
Nishimura et al.

(10) Patent No.: US 9,223,160 B2
(45) Date of Patent: Dec. 29, 2015

(54) DISPLAY

(71) Applicant: Sony Corporation, Tokyo (JP)

(72) Inventors: Taizo Nishimura, Kanagawa (JP);
Kentaro Okuyama, Kanagawa (JP);
Tomoaki Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 14/044,570

(22) Filed: Oct. 2, 2013

(65) Prior Publication Data

US 2014/0104521 A1 Apr. 17, 2014

(30) Foreign Application Priority Data

Oct. 11, 2012 (JP) ................................. 2012-226347

(51) Int. Cl.
| | |
|---|---|
| *G02F 1/1335* | (2006.01) |
| *G02F 1/133* | (2006.01) |
| *G02F 1/13* | (2006.01) |
| *G02F 1/1343* | (2006.01) |
| *G02F 1/1347* | (2006.01) |

(52) U.S. Cl.
CPC .......... *G02F 1/13306* (2013.01); *G02F 1/1323* (2013.01); *G02F 1/13476* (2013.01); *G02F 1/134309* (2013.01)

(58) Field of Classification Search
CPC .......... G02F 1/134309; G02F 1/13476; G02F 1/1323
See application file for complete search history.

(56) References Cited

U.S. PATENT DOCUMENTS

| | | | |
|---|---|---|---|
| 5,831,765 A * | 11/1998 | Nakayama et al. | 359/464 |
| 2002/0051354 A1* | 5/2002 | Egawa | 362/27 |
| 2003/0025856 A1* | 2/2003 | Takahashi et al. | 349/87 |
| 2005/0206814 A1* | 9/2005 | Histake | 349/112 |
| 2010/0066646 A1* | 3/2010 | Ota | 345/9 |
| 2010/0182537 A1* | 7/2010 | Ozawa et al. | 349/64 |
| 2011/0169877 A1* | 7/2011 | Ishida | 345/690 |
| 2011/0242146 A1* | 10/2011 | Uchida et al. | 345/690 |
| 2012/0069063 A1* | 3/2012 | Sato et al. | 345/690 |
| 2013/0077154 A1* | 3/2013 | Popovich et al. | 359/316 |
| 2013/0107164 A1* | 5/2013 | Verslegers et al. | 349/61 |
| 2014/0226093 A1* | 8/2014 | Schwartz et al. | 349/12 |

FOREIGN PATENT DOCUMENTS

| | | |
|---|---|---|
| JP | 09-46622 | 2/1997 |
| JP | 2008-040027 | 2/2008 |

* cited by examiner

*Primary Examiner* — Richard Kim
*Assistant Examiner* — Ryan Crockett
(74) *Attorney, Agent, or Firm* — K&L Gates LLP

(57) ABSTRACT

A display includes: a display panel; an illumination unit; and a driving unit. The illumination unit includes a pair of light transmissive substrates, two light sources, an optical modulation layer configured to exhibit diffusion or transparency for light from each of the two light sources, and an electrode. The optical modulation layer is configured to switch a wide-angle diffusion intensity and a front diffusion intensity of light emitted from the illumination unit, by switching of a magnitude of a voltage applied to the electrode. The driving unit allows a diffusion intensity ratio of the light emitted from the illumination unit in a dual-view mode to be higher than the diffusion intensity ratio in a normal mode by switching the magnitude of the voltage applied to the electrode. The diffusion intensity ratio is defined as dividing the wide-angle diffusion intensity by the front diffusion intensity.

5 Claims, 14 Drawing Sheets

DISPLAY

CROSS REFERENCES TO RELATED APPLICATIONS

The present application claims priority to Japanese Priority Patent Application JP 2012-226347 filed in the Japan Patent Office on Oct. 11, 2012, the entire content of which is hereby incorporated by reference.

BACKGROUND

The present application relates to a display capable of displaying two-dimensional images different from each other for a perspective on a front right side and a perspective on a front left side, respectively, and of displaying a common two-dimensional image for any perspectives including that in a front direction.

A display (a dual-view display) that displays two-dimensional images for two perspectives has been proposed (see, for example, Japanese Unexamined Patent Application Publication Nos. 2008-40027 and H09-46622). For example, JP 2008-40027A has proposed providing a parallax barrier on a display panel, and arranging pixels for a right-side image and pixels for a left-side image alternately in a horizontal direction. In addition, for example, JP H09-46622A has proposed providing a lenticular lens on a display panel, and arranging pixels for a right-side image and pixels for a left-side image alternately in a horizontal direction. These methods described in JP 2008-40027A and JP H09-46622A enable a viewer on the right side and a viewer on the left side to view respective images different from each other, by distributing image information to the viewer on the right side and the viewer on the left side through the parallax barrier and the lenticular lens.

SUMMARY

However, the method described in JP 2008-40027A has such a disadvantage that it is not easy to obtain a high-luminance image because of a large loss of luminance caused by the parallax barrier. The method described in JP H09-46622A also has such a disadvantage that it is difficult to view an image from front because only dual viewing is allowed.

It is desirable to provide a display capable of performing dual viewing at a high luminance, and also capable of switching from the dual viewing to image display in a front direction, and switching from the image display in the front direction to the dual viewing.

According to an embodiment of the present application, there is provided a display including: a display panel configured to display an image; an illumination unit configured to illuminate the display panel; and a driving unit configured to drive the display panel and the illumination unit. The illumination unit includes a pair of light transmissive substrates separated away from each other and disposed to oppose each other, two light sources one of which is disposed on a side face on a front right side of one of the pair of light transmissive substrates, and the other of which is disposed on a side face on a front left side of the one of the pair of light transmissive substrates, an optical modulation layer provided in space between the pair of light transmissive substrates, and configured to exhibit diffusion or transparency for light from each of the two light sources according to a magnitude of an electric field, and an electrode configured to generate the electric field in the optical modulation layer upon application of a voltage. The optical modulation layer is configured to switch a wide-angle diffusion intensity and a front diffusion intensity of light emitted from the illumination unit, by switching of a magnitude of the voltage applied to the electrode. The driving unit is configured to allow a diffusion intensity ratio of the light emitted from the illumination unit in a dual-view mode to be higher than the diffusion intensity ratio in a normal mode by switching the magnitude of the voltage applied to the electrode. The dual-view mode is a mode in which respective two-dimensional images different from each other for a perspective on a front right side and a perspective on a front left side are displayed. The normal mode is a mode in which a common two-dimensional image for any perspectives including a perspective in a front direction is displayed. The diffusion intensity ratio is defined as a ratio obtained by dividing the wide-angle diffusion intensity of the light emitted from the illumination unit, by the front diffusion intensity of the light emitted from the illumination unit.

In the display according to the above-described embodiment of the present application, the diffusion intensity ratio in the dual-view mode is made higher than the diffusion intensity ratio in the normal mode, by switching of the magnitude of the voltage applied to the electrode. In this way, in the above-described embodiment of the present application, the dual-view mode is achieved by performing the switching of the diffusion intensity ratio in the optical modulation layer and thus, a parallax barrier may not be necessarily used to achieve the dual-view mode. Further, in the above-described embodiment of the present application, switching from the dual-view mode to the normal mode and switching from the normal mode to the dual-view mode are allowed by switching the diffusion intensity ratio in the optical modulation layer. Therefore, in the above-described embodiment of the present application, there is no structural factor that obstructs switching of the modes.

According to the display of the above-described embodiment of the present application, the diffusion intensity ratio is switched by the switching of the magnitude of the voltage applied between the electrodes. Therefore, dual viewing is allowed to be performed at high luminance. Further, switching from dual viewing to image display in a front direction and switching from the image display in the front direction to the dual viewing are also allowed by switching of the diffusion intensity ratio.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to describe the principles of the technology.

DETAILED DESCRIPTION

Figure 1:
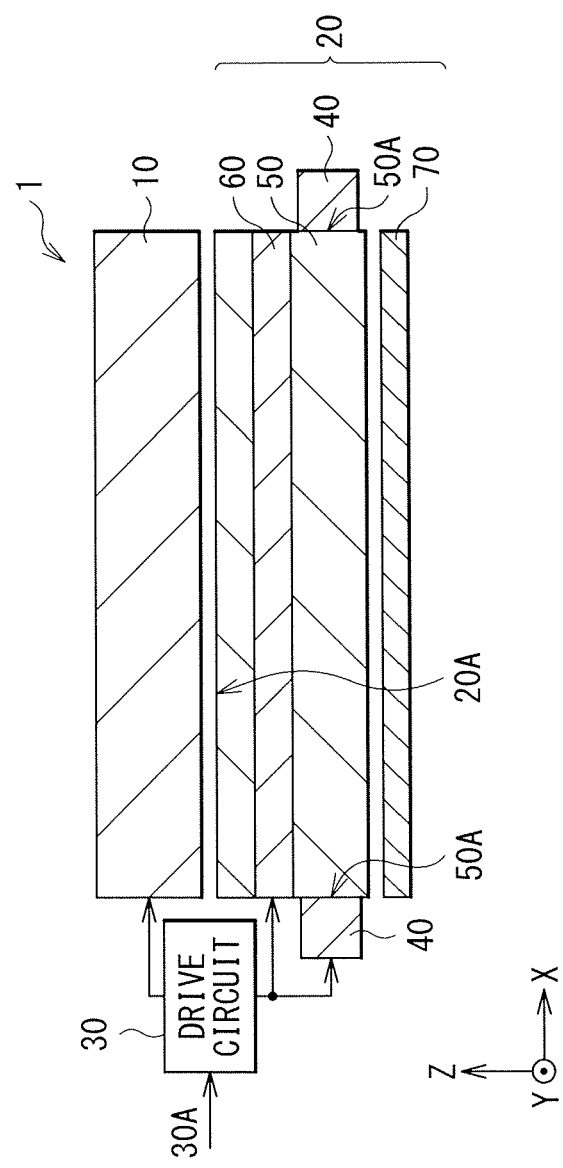
FIG. 1 is a cross-sectional diagram illustrating an example of a configuration of a display according to an embodiment of the present application.

An embodiment of the present disclosure will be described in detail with reference to the drawings. It is to be noted that the description will be provided in the following order.
1. Embodiment
2. Modifications 1. Embodiment Configuration Example FIG. 1 illustrates an example of a cross-sectional configuration of a display 1 according to an embodiment of the present application. It is to be noted that FIG. 1 illustrates the display 1 schematically, and the actual size and shape thereof are not limited to those in FIG. 1. The display 1 includes a display panel 10 displaying an image, a backlight 20 illuminating the display panel 10 from back, and a drive circuit 30 driving the display panel 10 and the backlight 20.

The display panel 10 includes a plurality of pixels arranged two-dimensionally, and displays an image by driving each of the pixels. For example, the display panel 10 may be a transmission-type Liquid Crystal Display (LCD) panel in which each pixel or specific pixels are driven according to an image signal. The display panel 10 may have a configuration in which a liquid crystal layer is interposed between a pair of light transmissive substrates. The display panel 10 may include, for example, a polarizing plate, a transparent substrate, a pixel electrode, an alignment film, the liquid crystal layer, an alignment film, a common electrode, a color filter, a transparent substrate, and a polarizing plate in order from the backlight 20 side, which are not illustrated.

The substrate is made of a substrate transparent for visible light, and may be, for example, flat glass. It is to be noted that at the substrate on the backlight 20 side, an active drive circuit that includes a Thin Film Transistor (TFT), wiring, and the like (which are not illustrated) electrically connected to the pixel electrode is formed. The pixel electrode and the common electrode may be made of, for example, Indium Tin Oxide (ITO). The pixel electrode is each of pixel electrodes arranged two-dimensionally on the transparent substrate, and functions as an electrode for each of the pixels. On the other hand, the common electrode is formed across a whole surface on the color filter, and functions as a common electrode facing each of the pixel electrodes. The alignment film may be made of, for example, a polymer material such as polyimide, and performs alignment processing for a liquid crystal.

Figure 2:
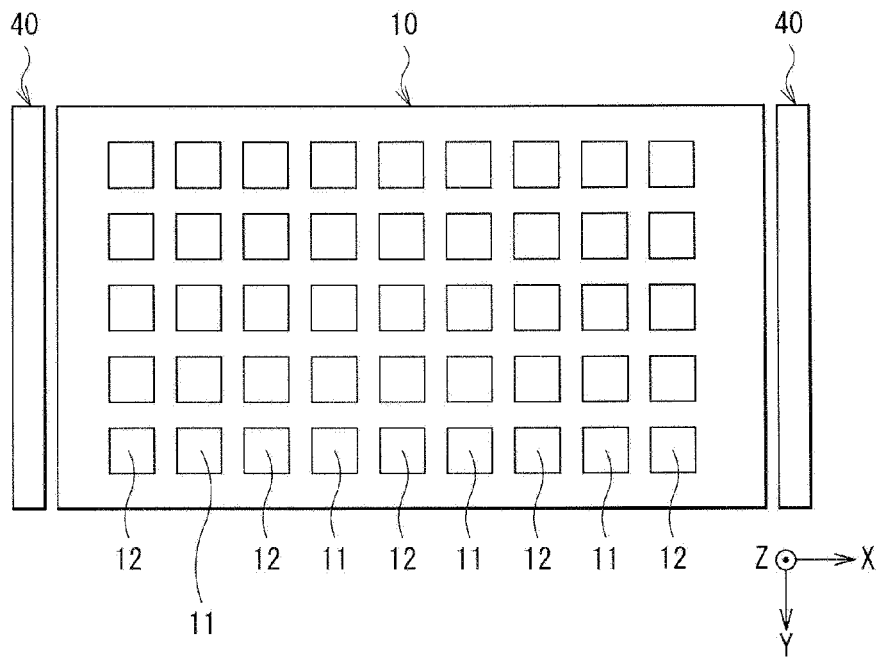
FIG. 2 is a top view illustrating an example of a configuration of a display panel in FIG. 1.

In the display panel 10, a part facing the pixel electrode functions as the pixel. For example, as illustrated in FIG. 2, in a dual-view mode, some of the plurality of pixels in the display panel 10 function as a plurality of display pixels 11 that display a two-dimensional image for a perspective on a front right side. Further, the plurality of pixels in the display panel 10 excluding the display pixels 11 function as a plurality of display pixels 12 that display a two-dimensional image for a perspective on a front left side. In other words, the display panel 10 includes the plurality of display pixels 11 and the plurality of display pixels 12 in the dual-view mode. On the other hand, in a normal mode, all the pixels (all the display pixels 11 and all the display pixels 12) in the display panel 10 function as display pixels that display a common two-dimensional image for any perspectives including that in a front direction.

The dual-view mode is a mode in which two-dimensional images different from each other for a perspective on a front right side and a perspective on a front left side, respectively, are displayed. On the other hand, the normal mode is a mode in which a common two-dimensional image for any perspectives including that in the front direction is displayed. The display pixel 11 is equivalent to a specific but not limitative example of "first pixel" in one embodiment of the present application, and the display pixel 12 is equivalent to a specific but not limitative example of "second pixel" in one embodiment of the present application.

The plurality of display pixels 11 and the plurality of display pixels 12 are arranged alternately in an opposing direction in which two light sources 40 provided in the backlight 20 described later are opposed to each other. The plurality of display pixels 11 are aligned in a direction intersecting (for example, orthogonal to) the opposing direction of the two light sources 40. The plurality of display pixels 12 are aligned in a direction intersecting (for example, orthogonal to) the opposing direction of the two light sources 40.

For example, the liquid crystal layer may be made of a liquid crystal in a VA (Vertical Alignment) mode, a TN (Twisted Nematic) mode, or a STN (Super Twisted Nematic) mode, and may have a function of changing the direction of a polarization axis of an outgoing beam from the backlight 20 for each of the pixels, by application of a voltage from the drive circuit 30. It is to be noted that the direction of a transmission axis for each of the pixels may be adjusted in multiple stages, by changing a liquid crystalline order in multiple stages. The color filter may be each of filters forming an array corresponding to an array of the pixel electrodes. For example, the filters may separate light passing through the liquid crystal layer into three primary colors of red (R), green (G), and blue (B), or into four colors of R, G, B, and white (W).

The polarizing plate is a kind of optical shutter, and allows light (polarized light) in a certain vibration direction to pass therethrough. It is to be noted that the polarizing plate may be an absorbing-type polarizing device that absorbs light (polarized light) in any vibration direction other than the transmission axis, but may be preferably a reflection-type polarizing device that reflects light toward the backlight 20 side, from the viewpoint of improving luminance. The two polarizing plates are disposed to have the respective polarizing axes different from each other at 90 degrees. Thus, an outgoing beam from the backlight 20 is allowed to pass through or blocked by the liquid crystal layer. In the polarizing plate on the backlight 20 side, for example, the transmission axis may face in a direction parallel to an alignment direction (a rubbing direction) of each of alignment films 63 and 65 in a light modulation device 60 described later.

For example, the backlight 20 may illuminate the display panel 10 from the back. The backlight 20 may include, for example, a light-guiding plate 50, the two light sources 40 disposed on side faces of the light-guiding plate 50, the light modulation device 60 in contact with the light-guiding plate 50, a light reflector 70 disposed behind the light-guiding plate 50, and the drive circuit 30 driving the light modulation device 60. The light-guiding plate 50 is equivalent to a specific but not limitative example of "light transmissive substrate" according to one embodiment of the technology. It is to be noted that, for example, the light modulation device 60 may be joined to a top surface or a back surface (undersurface) of the light-guiding plate 50 in intimate contact therewith, without air space therebetween.

The light-guiding plate 50 is a plate that guides light coming from the light sources 40 disposed on the side faces of the light-guiding plate 50, to the top surface of the light-guiding plate 50. The light-guiding plate 50 has a shape corresponding to that of the display panel 10 disposed on the top surface of the light-guiding plate 50. Examples of this shape may include a rectangular parallelepiped in which inside is surrounded by a top surface, an undersurface, and side faces. It is to be noted that in the following, among the side faces of the light-guiding plate 50, one on which light coming from the light source 40 is incident will be referred to as a light incident surface 50A. For example, the light-guiding plate 50 may have a predetermined patterned-shape on at least one or both of the top surface and the undersurface, and may have a function of diffusing the light entering from the light incident surface 50A, to make the light uniform. It is to be noted that in a case in which luminance is made uniform by modulating a voltage applied to the backlight 20, a flat light-guiding plate that is not patterned may be used as the light-guiding plate 50. The light-guiding plate 50 may mainly include, for example, a transparent thermoplastic resin such as polycarbonate resin (PC) and acrylic resin (polymethyl methacrylate (PMMA)).

Each of the light sources 40 includes a linear light source, which may be, for example, a Hot Cathode Fluorescent Lamp (HCFL), a Cold Cathode Fluorescent Lamp (CCFL), or a light source made of a plurality of LEDs (Light Emitting Diodes) arranged in a line. When each of the light sources 40 includes a plurality of LEDs, all the LEDs may be preferably white LEDs, in terms of efficiency, slimming down, and, uniformity. It is to be noted that each of the light sources 40 may include, for example, a red LED, a green LED, and a blue LED.

The two light sources 40 are disposed on the side face on the front right side and the side face on the front left side, of the light-guiding plate 50. The light source 40 may include, for example, a linear light source and a reflecting mirror. The linear light source may be made of, for example, a HCFL or a CCFL. The reflecting mirror reflects a part of light emitted from the linear light source. The part of the light is light that goes in a direction of not being directly incident on the light incident surface 50A, and is reflected to the light incident surface 50A side. Alternatively, the light source 40 may include, for example, a plurality of point light sources arranged in a line. Each of the point light sources emits light to the light incident surface 50A, and may be made of, for example, a light-emission device having a light emission spot on a surface facing the light incident surface 50A. Examples of such a light-emission device may include, for example, LED and Laser Diode (LD). Each of the point light sources may be preferably a white LED, in terms of efficiency, slimming down, and, uniformity. It is to be noted that the plurality of point light sources included in the light source 40 may include, for example, a red LED, a green LED, and a blue LED.

The light reflector 70 has a reflection function, and returns light leaking out from the back of the light-guiding plate 50 through the light modulation device 60, toward the light-guiding plate 50 side. This makes it possible to effectively use an outgoing beam from the light source 40, and also helps to improve front luminance. The light reflector 70 may be made of, for example, a multilayered reflection film (e.g. an ESR (Enhanced Specular Reflector)). It is to be noted that, for example, the light reflector 70 may be omitted as necessary.

The light modulation device 60 is in intimate contact with the light-guiding plate 50 without air space therebetween, and may be, for example, adhered to the light-guiding plate 50 with an adhesive (not illustrated) provided therebetween. In the light modulation device 60, for example, a substrate 61, a lower electrode 62, an alignment film 63, an optical modulation layer 64, the alignment film 65, an upper electrode 66, and a substrate 67 may be disposed in order from the light reflector 70 side, as illustrated in FIG. 3.

The substrates 61 and 67 support the optical modulation layer 64, and are each configured of, typically, a substrate that is transparent for visible light (a light transmissive substrate). Examples of this substrate may include a glass plate and a plastic film. The electrode produces an electric field. The electric field is produced in the optical modulation layer 64, when a voltage is applied between the lower electrode 62 and the upper electrode 66 (hereinafter simply referred to as "between the electrodes"). The lower electrode 62 is provided on a side closer to the substrate 61 in relation to the optical modulation layer 64, and the upper electrode 66 is provided on a side closer to the substrate 67 in relation to the optical modulation layer 64. The substrates 61 and 67 are equivalent to a specific but not limitative example of "light transmissive substrate" in one embodiment of the present application. The lower electrode 62 and the upper electrode 66 are equivalent to a specific but not limitative example of "electrode" in one embodiment of the present application.

Figure 3:
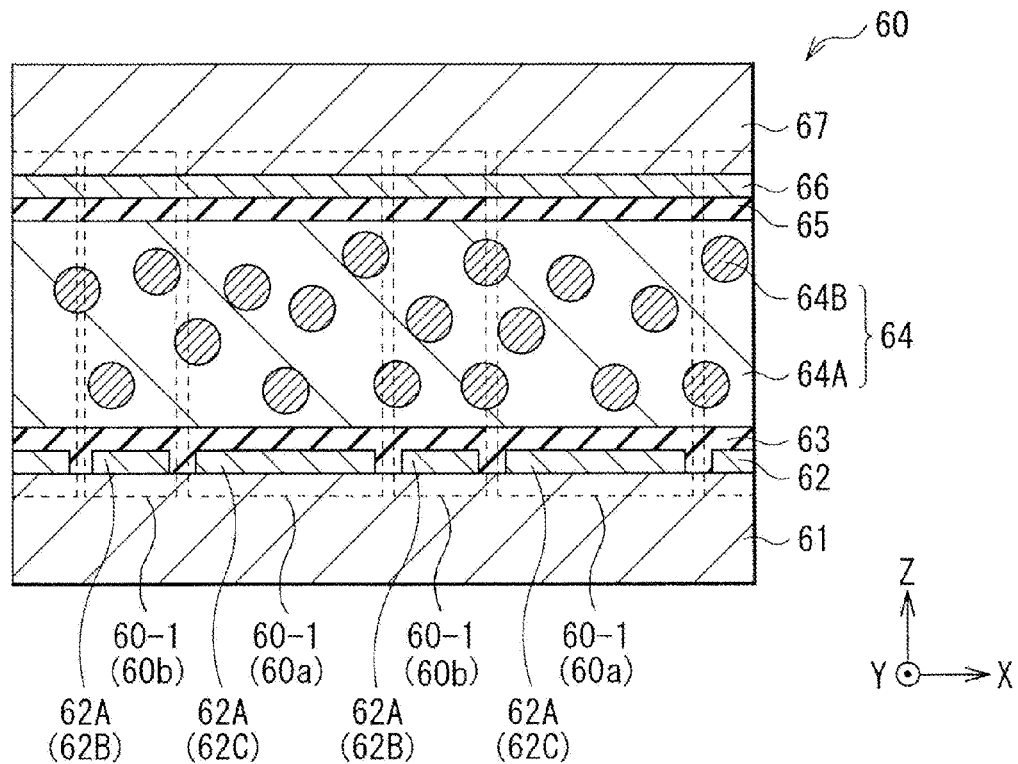
FIG. 3 is a cross-sectional diagram illustrating an example of a configuration of a light modulation device in FIG. 1.
Figure 4:
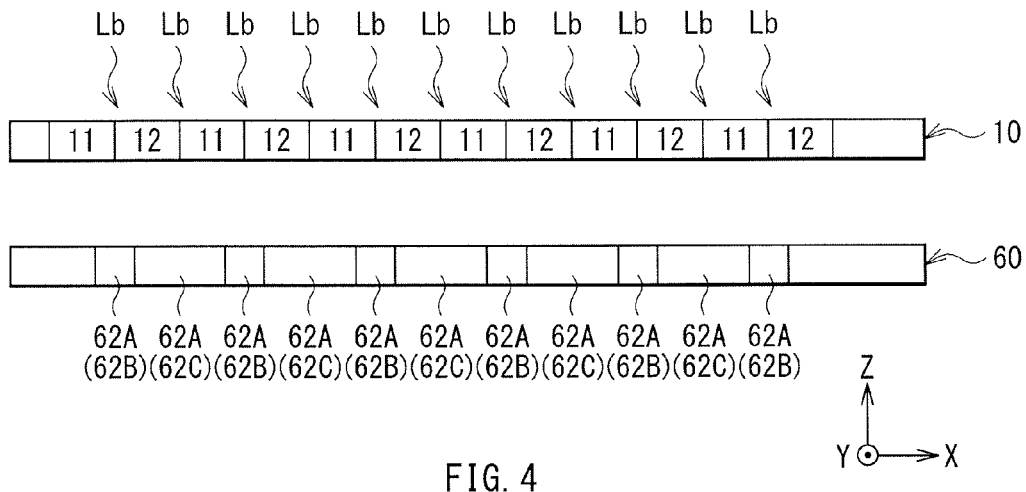
FIG. 4 is a diagram illustrating an example of a positional relationship between a partial electrode in FIG. 3 and a display pixel.

The lower electrode 62 may be configured of, for example, a plurality of partial electrodes 62A, as illustrated in FIG. 3. Each of the partial electrodes 62A is shaped like a strip extending in a direction intersecting (for example, orthogonal to) the opposing direction of the two light sources 40. Some specific partial electrodes 62A (hereinafter referred to as "partial electrode 62B") among the plurality of partial electrodes 62A are used for generation of linear illumination light in the dual-view mode. Each of the electrodes 62B may be disposed at, for example, a position facing a border Lb between the display pixel 11 and the display pixels 12, as illustrated in FIG. 4. The plurality of partial electrodes 62A excluding the partial electrodes 62B (hereinafter referred to as "partial electrode 62C") are used for generation of planar illumination light in the normal mode, together with the partial electrodes 62B. In other words, all the partial electrodes 62A are used to generate planar illumination light in the normal mode. Each of the partial electrodes 62C may be disposed at, for example, a position facing the border Lb, as with the partial electrode 62B.

A partial-electrode group, which includes a plurality of sets each including one of the partial electrodes 62B and one or more of the partial electrodes 62C, is arranged in the opposing direction of the two light sources 40. FIG. 4 illustrates, as an example, a case in which the partial-electrode group including a plurality of sets each including one of the partial electrodes 62B and one of the partial electrodes 62C is arranged in the opposing direction of the two light sources 40. It is to be noted that the partial-electrode group may be configured of, for example, one of the partial electrodes 62B and two of the partial electrodes 62C, or may be configured of one of the partial electrodes 62B and three or more of the partial electrodes 62C.

The above-described partial-electrode group is arranged with the same pitch as the pixel pitch of the display pixels 11 or the display pixels 12 in the opposing direction of the two light sources 40. In addition, similarly, the plurality of partial electrodes 62B are arranged with the same pitch as the pixel pitch of the display pixels 11 or the display pixels 12 in the opposing direction of the two light sources 40. The partial electrode 62B has a width smaller than that of the pixel of the display panel 10. It is to be noted that when the partial-electrode group includes one of the partial electrodes 62B and a plurality of the partial electrodes 62C, the partial electrode 62C may preferably have a width equal to that of the partial electrode 62B. Alternatively, when the partial-electrode group includes one of the partial electrodes 62B and one of the partial electrodes 62C, the width of the partial electrode 62C may be, for example, larger than that of the partial electrode 62B, or may be equal that of the partial electrode 62B, although illustration thereof is omitted. It is to be noted that when an extending direction of the partial electrodes 62B is parallel to an array direction of the display pixels 11 and 12, moire may occur in an image on the display panel 10. Therefore, from the viewpoint of reducing moire, the partial electrodes 62B may preferably extend in a direction that diagonally intersects the array direction of the display pixels 11 and 12 to some extent.

The upper electrode 66 may be configured of, for example, a plurality of partial electrodes 66A (not illustrated). The plurality of partial electrodes 66A are each shaped like a strip extending in a direction intersecting (for example, orthogonal to) the partial electrode 62A. It is to be noted that the upper electrode 66 may a single sheet-shaped electrode (a solid film) facing the entire lower electrode 62. The lower electrode 62 and the upper electrode 66 are each configured of a transparent conductive film (e.g. ITO film). It is to be noted that the lower electrode 62 and the upper electrode 66 may be configured of Indium Zinc Oxide (IZO), metal nanowire, carbon nanotube, graphene, or the like.

A part of the light modulation device 60 forms optical modulation cells 60a and 60b. This part corresponds to where the lower electrode 62 and the upper electrode 66 face each other, when the lower electrode 62 and the upper electrode 66 are viewed from the normal direction of the light modulation device 60 (see, for example, FIG. 3). The optical modulation cell 60a is a part of the light modulation device 60, the part corresponding to where the partial electrode 62C and the partial electrode 66A face each other. The optical modulation cell 60b is a part of the light modulation device 60, the part corresponding to where the partial electrode 62B and the partial electrode 66A face each other. The optical modulation cell 60a and the optical modulation cell 60b are next to each other. It is to be noted that when the upper electrode 66 is a solid film, the optical modulation cell 60a is a part of the light modulation device 60, the part corresponding to where the partial electrode 62C and the upper electrode 66 face each other. Further, when the upper electrode 66 is a solid film, the optical modulation cell 60b is a part of the light modulation device 60, the part corresponding to where the partial electrode 62B and the upper electrode 66 face each other.

Each of the optical modulation cells 60a and 60b is capable of being driven by application of a predetermined voltage to the partial electrode 62A and the partial electrode 66A. Each of the optical modulation cells 60a and 60b exhibits transparency (optical transparency) or diffusion for light coming from the light source 40, according to the magnitude of the voltage applied to the partial electrode 62A and the partial electrode 66A. It is to be noted that these transparency and diffusion will be described in detail, in description of the optical modulation layer 64.

The alignment films 63 and 65 may be provided, for example, to align a liquid crystal and a monomer used in the optical modulation layer 64. Examples of the alignment film may include a perpendicular alignment film and a horizontal alignment film. In the present embodiment, the horizontal alignment film is used for each of the alignment films 63 and 65. Examples of the horizontal alignment film may include alignment films formed by applying a rubbing process to polyimide, polyamide-imide, polyvinyl alcohol, or the like, and alignment films in which a groove shape is provided by transfer, etching, or the like. Further, other examples of the horizontal alignment film may include alignment films formed by performing oblique deposition of an inorganic material such as silicon oxide, diamond like carbon alignment films formed by ion beam irradiation, and alignment films in which an electrode pattern slit is formed.

Either the perpendicular alignment film or the horizontal alignment film is sufficient as long as the film has a function of aligning a liquid crystal and a monomer. Reliability or the like by repeated application of a voltage desired for an ordinary liquid crystal display may be not necessary. This is because reliability by voltage application after fabrication of a device is determined by an interface between a polymerized monomer and a liquid crystal. Further, the liquid crystal and the monomer used in the optical modulation layer 64 may be aligned without using an alignment film. The liquid crystal and the monomer may be aligned also by, for example, application of an electric field or a magnetic field between the electrodes. In other words, it is possible to fix the alignment state of the liquid crystal and the monomer in a voltage-applied state by ultraviolet irradiation, while applying an electric field or a magnetic field between the electrodes. When a voltage is used for formation of the alignment film, separate electrodes for alignment and driving, respectively, may be formed, or a dual-frequency liquid crystal or the like in which sign inversion in dielectric anisotropy occurs depending on frequency may be used as a liquid crystal material. Further, when the magnetic field is used for formation of the alignment film, a material in which magnetic susceptibility anisotropy is large may be preferably used for the alignment film. Specifically, for example, a material having many benzene rings may be preferably used.

The optical modulation layer 64 is provided in space between the substrate 61 and the substrate 67. The optical modulation layer 64 exhibits diffusion or transparency for light coming from the light source 40, according to the magnitude of an electric field. The optical modulation layer 64 exhibits the transparency for the light coming from the light source 40 when the electric field is relatively small, while demonstrating the diffusion for the light coming from the light source 40 when the electric field is relatively large. For example, as illustrated in FIG. 3, the optical modulation layer 64 may be a composite layer that includes a polymer region 64A and a plurality of fine-particle-shaped liquid crystal regions 64B dispersed in the polymer region 64A. The polymer region 64A and the liquid crystal regions 64B have optical anisotropy. The polymer region 64A is equivalent to a specific but not limitative example of "second region" in one embodiment of the present application. The liquid crystal region 64B is equivalent to a specific but not limitative example of "first region" in one embodiment of the present application.

Figure 5:
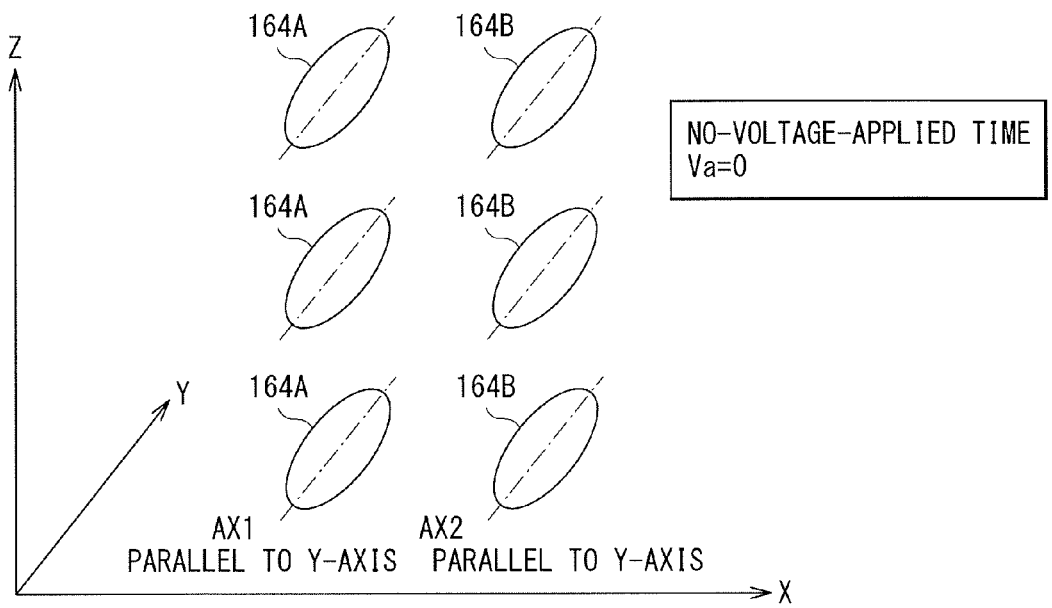
FIG. 5 is a diagram illustrating an example of a function of the light modulation device in FIG. 1.

FIG. 5 illustrates an example of an index ellipsoid that indicates refractive index anisotropy of the polymer region 64A and the liquid crystal region 64B, when a voltage is not applied between the electrodes (hereinafter simply referred to as "no-voltage-applied time"). As used herein, the term "no-voltage-applied time" refers to a concept that also encompasses the time of applying a voltage, which is smaller than a voltage causing the optical modulation layer 64 to exhibit the diffusion, and causes the optical modulation layer 64 to exhibit the transparency. This index ellipsoid represents a refractive index of linearly polarized light incident from each of various directions, by using a tensor ellipsoid. The index ellipsoid allows the refractive index to be found geometrically, by viewing a cross section of the ellipsoid from a light-incident direction.

Figure 6:
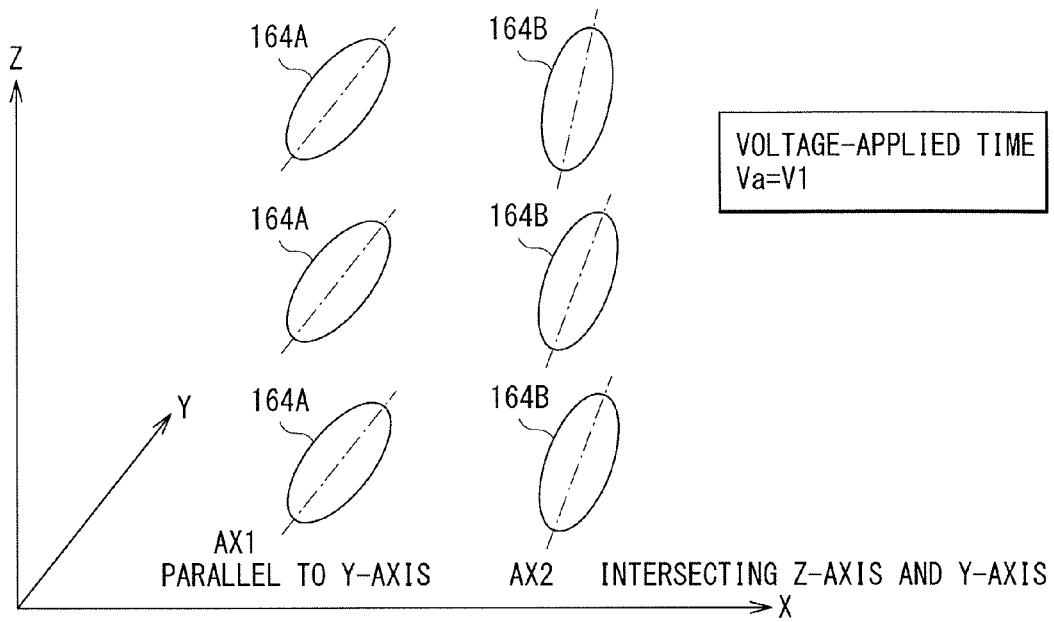
FIG. 6 is a diagram illustrating another example of a function of the light modulation device in FIG. 1.
Figure 7:
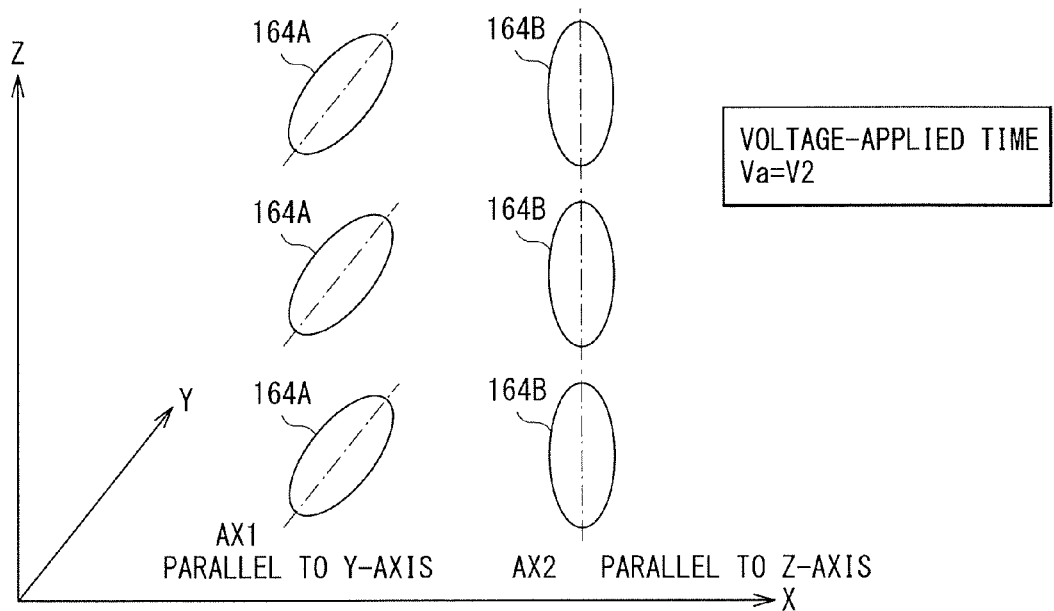
FIG. 7 is a diagram illustrating still another example of a function of the light modulation device in FIG. 1.

FIG. 6 and FIG. 7 each illustrate an example of an index ellipsoid that indicates the refractive index anisotropy of the polymer region 64A and the liquid crystal regions 64B, when a voltage is applied between the electrodes (hereinafter simply referred to as "voltage-applied time"). As used herein, the term "voltage-applied time" refers to the time when a voltage causing the optical modulation layer 64 to exhibit the diffusion is applied. FIG. 6 illustrates the example of the index ellipsoid when the voltage applied between the electrodes is relatively small (Va=V1), and FIG. 7 illustrates the example of the index ellipsoid when the voltage applied between the electrodes is relatively large (Va=V2>V1).

For example, as illustrated in FIG. 5, the polymer region 64A and the liquid crystal region 64B may be configured such that a direction of an optical axis AX1 of the polymer region 64A and a direction of an optical axis AX2 of the liquid crystal region 64B agree with each other (parallel to each other), at the no-voltage-applied time. It is to be noted that the optical axes AX1 and AX2 each refer to a line parallel to a traveling direction of a light ray in which the refractive index is one value irrespective of a polarization direction. In addition, the directions of the optical axis AX1 and the optical axis AX2 may not agree with each other constantly. For example, the directions of the optical axis AX1 and the optical axis AX2 may be misaligned to some extent by a manufacturing error and the like.

Moreover, for example, the liquid crystal region 64B may be configured to have the optical axis AX2 intersecting (or orthogonal to) the opposing direction of the two light sources 40, at the no-voltage-applied time. The liquid crystal region 64B may be preferably configured to have the optical axis AX2 orthogonal to the opposing direction of the two light sources 40, at the no-voltage-applied time. It is to be noted in the following, "intersecting (or orthogonal to) the opposing direction of the two light sources 40" may be preferably read as "orthogonal to the opposing direction of the two light sources 40". Further, for example, the liquid crystal region 64B may be configured to have the optical axis AX2 intersecting a surface of each of the substrates 61 and 67 at a small angle θ1, at the no-voltage-applied time. It is to be noted that the angle θ1 will be described in detail, in description of a material of the liquid crystal region 64B.

On the other hand, for example, the polymer region 64A may be configured such that the optical axis AX1 of the polymer region 64A is constant regardless of the presence or absence of voltage application between the electrodes. Specifically, for example, the polymer region 64A may be configured such that the optical axis AX1 of the polymer region 64A intersects (or is orthogonal to) the opposing direction of the two light sources 40, and also intersects the surface of each of the substrates 61 and 67 at the predetermined angle θ1. In other words, the optical axis AX1 of the polymer region 64A is parallel to the optical axis AX2 of the liquid crystal region 64B, at the no-voltage-applied time.

It is to be noted that it is not necessary for the optical axis AX2 to constantly intersect (or be orthogonal to) the opposing direction of the two light sources 40 and also to intersect the surface of each of the substrates 61 and 67 at the predetermined angle θ1. For example, the optical axis AX2 may intersect the surface of each of the substrates 61 and 67 at an angle slightly different from the angle θ1 due to a manufacturing error and the like. Further, it is not necessary for the optical axes AX1 and AX2 to constantly intersect the opposing direction of the two light sources 40, and may, for example, intersect a direction orthogonal to the opposing direction of the two light sources 40 at a small angle, due to a manufacturing error and the like.

Figure 8:
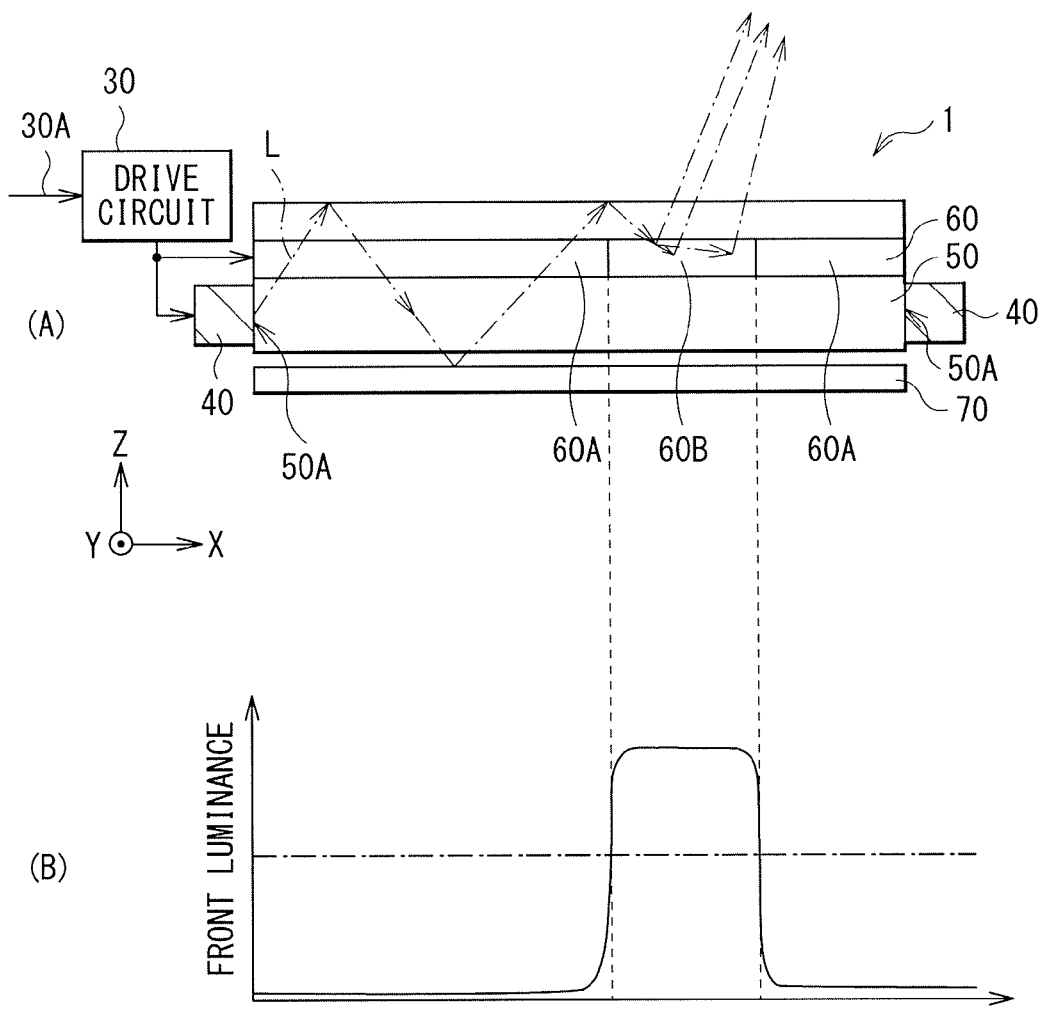
FIG. 8 is a diagram illustrating an example of a function of a backlight in FIG. 1.

Here, preferably, an ordinary-ray refractive index of the polymer region 64A and that of the liquid crystal region 64B may be equal to each other, and an extraordinary-ray refractive index of the polymer region 64A and that of the liquid crystal region 64B may also be equal to each other. In this case, for example, at the no-voltage-applied time, there may be little refractive index difference in every direction including a front direction and oblique directions, and high transparency (optical transparency) is obtained. Thus, for example, light toward the front direction and light toward the oblique directions may pass through the optical modulation layer 64, without being diffused in the optical modulation layer 64. As a result, for example, as illustrated in FIG. 8, light L from the light source 40 (light from an oblique direction) may be totally reflected, for example, on an upper interface and a lower interface of a transparent region (a transparent region 60A) in the optical modulation layer 64, of the light-guiding plate 50. Thus, luminance of the transparent region 60A (luminance of black display) decreases as compared with a case in which the entire surface is caused to emit light uniformly (a dashed line in Part (B) of FIG. 8). It is to be noted that a profile of front luminance in Part (B) of FIG. 8 is obtained by placing a diffusion sheet on the light-guiding plate 50, and performing measurement through the diffusion sheet.

It is to be noted that the top surface of the light-guiding plate 50, which is one of the interfaces of the transparent region 60A, is in contact with space between the display panel 10 and the light-guiding plate 50, but this space may be preferably filled with a material having a refractive index lower than that of the top surface of the light-guiding plate 50. A layer made of such a material having a low refractive index is typically air, but may be an adhesive or a binder made of a material having a low refractive index.

The polymer region 64A and the liquid crystal region 64B may be configured such that, for example, the direction of the optical axis AX1 and that of the optical axis AX2 are different from each other (intersect, or substantially orthogonal to each other) as illustrated in FIG. 6 and FIG. 7, at the voltage-applied time. Further, for example, the liquid crystal region 64B may be configured such that the optical axis AX2 of the liquid crystal region 64B intersects (or is orthogonal to) the opposing direction of the two light sources 40, and also intersects the surface of each of the substrates 61 and 67 at an angle $\theta 2$ larger than the angle $\theta 1$, at the voltage-applied time. When a voltage of Va=V1 is applied, the size of the angle $\theta 2$ is smaller than that in a case in which a voltage of Va=V2 is applied. It is to be noted that the angle $\theta 2$ will be described in detail, in description of the material of the liquid crystal region 64B.

Therefore, in the optical modulation layer 64, at the voltage-applied time, the refractive index difference increases in all directions including the front direction and the oblique directions, and high diffusion is achieved. Thus, for example, light toward the front direction and the light toward the oblique directions may be diffused in the optical modulation layer 64. As a result, for example, as illustrated in FIG. 8, the light L coming from the light source 40 (the light from the oblique direction) passes through an upper interface and a lower interface of a region (a diffusion region 60B) exhibiting diffusion in the optical modulation layer 64, of the light-guiding plate 50. Further, the light transmitted toward the light reflector 70 is reflected on the light reflector 70, and passes through the light modulation device 60. Therefore, the luminance of the diffusion region 60B is much higher than that in the case in which the entire surface is caused to emit light uniformly (the dashed line in Part (B) of FIG. 8). Besides, luminance of partial white display increases (pushing-up of luminance) by a decline in the luminance of the transparent region 60A.

It is to be noted that the ordinary-ray refractive index of the polymer region 64A and that of the liquid crystal region 64B may be different from each other to some extent by a manufacturing error and the like, and may be, for example, preferably 0.1 or less, and more preferably, 0.05 or less. Further, for example, the extraordinary-ray refractive index of the polymer region 64A and that of the liquid crystal region 64B may also be different from each other to some extent by a manufacturing error and the like, and may be, for example, preferably 0.1 or less, and more preferably, 0.05 or less.

Furthermore, the refractive index difference ($\Delta nP$=extraordinary-ray refractive index neP– ordinary-ray refractive index noP) of the polymer region 64A and the refractive index difference ($\Delta nL$=extraordinary-ray refractive index neL– ordinary-ray refractive index noL) of the liquid crystal region 64B may each be preferably as large as possible, and may each be, for example, preferably 0.05 or more, more preferably, 0.1 or more, and still more preferably, 0.15 or more. This is because, when the refractive index difference of each of the polymer region 64A and the liquid crystal region 64B is large, diffusion power of the optical modulation layer 64 increases, making it possible to readily destroy light-guiding conditions, which makes it easy to extract light from the light-guiding plate 50.

Further, the polymer region 64A and the liquid crystal region 64B are different from each other in terms of speed of response to an electric field. For example, the polymer region 64A may have a stripe-shaped structure, a porous structure, or a bar-like structure having a response speed lower than that of the liquid crystal region 64B. The polymer region 64A may be formed, for example, using a polymer material obtained by polymerization of a low-molecular monomer. The polymer region 64A may be formed by, for example, polymerizing a material capable of being aligned and polymerized (for example, a monomer) and having an alignment direction along the alignment direction of the liquid crystal region 64B or the alignment direction of the alignment films 63 and 65, through use of one or both of heat and light.

The stripe-shaped structure, the porous structure, or the bar-like structure of the polymer region 64A may have, for example, a major axis extending in a direction intersecting (or orthogonal to) the opposing direction of the two light sources 40, and also intersecting the surface of each of the substrates 61 and 67 at the small angle $\theta 1$. Preferably, an average pitch of a minor-axis direction of the stripe-shaped structure, the porous structure, or the bar-like structure in the polymer region 64A may be about 0.1 μm or more and about 5 μm or less, from the viewpoint of increasing diffusion of guided light. Further, the above-described pitch may be, preferably, 1 μm or more and about 5 μm or less, from the viewpoint of increasing wide-angle diffusion intensity that will be described later. Therefore, the above-described pitch may be preferably about 1 μm or more and about 5 μm or less, from the viewpoint of increasing the diffusion of guided light and also increasing the wide-angle diffusion intensity.

When the above-described pitch is about 0.1 μm or more and about 10 μm or less, the diffusion power in the light modulation device 60 is substantially uniform in a visible region of about 380 nm to about 780 nm both inclusive. Therefore, an increase or a decrease in only light of a particular wavelength component may not occur in a plane, and thus, it is possible to achieve a balance in the visible region in the plane. When the above-described pitch is less than 0.1 μm or exceeds 10 μm, the diffusion power of the light modulation device 60 is low, and the light modulation device 60 does not easily function as a light modulation device, regardless of wavelength.

Further, from the viewpoint of reducing wavelength dependency of diffusion, the above-described pitch may be preferably in a range of about 0.5 μm or more and about 5 μm or less both inclusive, and more preferably, in a range of about 1 μm to about 3 μm both inclusive. In this case, when the light emitted from the light source 40 repeatedly passes through the polymer region 64A in the light modulation device 60 while propagating the light-guiding plate 50, the wavelength dependency of the diffusion in the polymer region 64A is suppressed. The stripe-shaped structure, the porous structure, or the bar-like structure of the polymer region 64A may be observed with a polarizing microscope, a confocal microscope, an electron microscope, and the like.

On the other hand, the liquid crystal region 64B may mainly include, for example, a liquid crystal material, and may have a response speed sufficiently higher than that of the polymer region 64A. The liquid crystal material (a liquid crystal molecule) included in the liquid crystal region 64B may be, for example, a rodlike molecule. A liquid crystal molecule having positive dielectric anisotropy (a so-called positive-type liquid crystal) may be preferably used as the liquid crystal molecule included in the liquid crystal region 64B.

Here, at the no-voltage-applied time, the major-axis direction of the liquid crystal molecule is parallel to the optical axis AX1 in the liquid crystal region 64B. At this moment, the major axis of the liquid crystal molecule in the liquid crystal region 64B intersects (or is orthogonal to) the opposing direction of the two light sources 40, and also intersects the surface of each of the substrates 61 and 67 at the small angle $\theta 1$. In other words, at the no-voltage-applied time, the liquid crystal molecule in the liquid crystal region 64B is aligned in a state of being tilted by only the angle θ1 in the plane that intersects (or is orthogonal to) the opposing direction the two light sources 40. This angle θ1 is an angle called a pre-tilt angle, and may be preferably, for example, in a range of about 0.1 degree or more and about 30 degrees or less both inclusive. The angle θ1 may be more preferably in a range of about 0.5 degree or more and 10 degrees or less both inclusive, and still more preferably, in a range of about 0.7 degree or more and 2 degrees or less both inclusive. When the angle θ1 is increased, efficiency of diffusion tends to decrease for a reason that will be described later. On the other hand, when the angle θ1 is reduced excessively, an azimuth angle at which the liquid crystal is upright varies at the voltage-applied time. For example, the liquid crystal may be upright in an orientation that is 180 degrees opposite (reverse tilt). Thus, the refractive index difference between the liquid crystal region 64B and the polymer region 64A is not effectively utilized, and therefore, diffusion efficiency tends to decline, and luminance tends to decrease.

Meanwhile, at the voltage-applied time, the major-axis direction of the liquid crystal molecule intersects or is orthogonal to (or is substantially orthogonal to) the optical axis AX1, in the liquid crystal region 64B. At this moment, the major axis of the liquid crystal molecule in the liquid crystal region 64B intersects (or is orthogonal to) the opposing direction of the two light sources 40, and also intersects the surface of each of the substrates 61 and 67 at the angle θ2 (e.g. 90 degrees) that is larger than the angle θ1. In other words, at the voltage-applied time, the liquid crystal molecule in the liquid crystal region 64B is aligned in a state of being tilted by only the angle θ2 or in a state of being upright at the angle θ2 (=90 degrees) in the plane that intersects (or is orthogonal to) the opposing direction of the two light sources 40.

The above-described monomer capable of being aligned and polymerized may be a material optically having anisotropy and capable of forming a compound together with a liquid crystal, but in the present embodiment, the above-described monomer may be preferably a low-molecular monomer that is curable by an ultraviolet ray. In a state in which a voltage is not applied, a material (a polymer material) formed by polymerizing the low-molecular monomer may preferably agree with the liquid crystal in terms of direction of optical anisotropy. Therefore, the liquid crystal and the low-molecular monomer may be preferably aligned in the same direction, before ultraviolet curing. In a case in which a liquid crystal is used for the liquid crystal region 64B, when the liquid crystal is a rodlike molecule, the monomer material to be used may be preferably shaped like a rod. Therefore, a material polymerizable and having liquid crystallinity may be preferably used as the monomer material. For example, this material may preferably include, as a polymeric functional group, at least one functional group selected from a group including an acrylate group, a methacrylate group, an acryloyl oxy group, a methacryloyloxy group, a vinyl ether group, and an epoxy group. These functional groups may be polymerized by irradiation with an ultraviolet ray, an infrared ray, or an electron beam, or by heating. In order to suppress a decline in degree of alignment at the time of the ultraviolet irradiation, a polyfunctional liquid crystal material may also be added. When the polymer region 64A is assumed to have the stripe-shaped structure described above, a bifunction liquid-crystalline monomer may be preferably used as a raw material of the polymer region 64A. Further, a monofunctional monomer may be added to the raw material of the polymer region 64A for the purpose of adjusting a temperature indicating liquid crystallinity, or a tri-or-more functional monomer may be added for the purpose of improving crosslink density.

Meanwhile, as described above, the optical axis AX1 of the polymer region 64A and the optical axis AX2 of the liquid crystal region 64B mainly have the respective optical-axis components in the same direction, at the no-voltage-applied time. At the no-voltage-applied time, the optical axes AX1 and AX2 both face in the same direction as illustrated in FIG. 5, and may face, for example, in the rubbing directions of the alignment films 63 and 65. Further, at the no-voltage-applied time, both the optical axes AX1 and AX2 are parallel or substantially parallel to the plane intersecting (or orthogonal to) the opposing direction of the two light sources 40, as illustrated in FIG. 5. Furthermore, at the no-voltage-applied time, the optical axes AX1 and AX2 are parallel to or substantially parallel to the substrate 61. In other words, at the no-voltage-applied time, the optical axes AX1 and AX2 substantially face in a Y-axis direction of FIG. 5.

Still furthermore, at the no-voltage-applied time, the optical axes AX1 and AX2 each mainly have the optical-axis component in a direction parallel to a transmission axis AX10 (not illustrated) of the polarizing plate on the backlight 20 side. At the no-voltage-applied time, for example, the optical axes AX1 and AX2 may face in the direction parallel to the transmission axis AX10. The transmission axis AX10 may, for example, face in the rubbing directions of the alignment films 63 and 65. It is to be noted that a transmission axis AX11 (not illustrated) of the polarizing plate on the image display surface side is orthogonal to the transmission axis AX10.

Further, as described above, at the voltage-applied time, the optical axis AX1 faces in the same or substantially the same direction as that at the no-voltage-applied time. At the voltage-applied time, the optical axis AX1 mainly has the optical-axis component in the direction parallel to the transmission axis AX10 of the polarizing plate on the backlight 20 side, and may face, for example, in the direction parallel to the transmission axis AX10, as illustrated in FIG. 6 and FIG. 7. At the voltage-applied time, the optical axis AX1 may be, for example, parallel to or substantially parallel to the plane intersecting (or orthogonal to) the opposing direction of the two light sources 40, and further, may be substantially parallel to the substrate 61.

On the other hand, the optical axis AX2 is displaced in a predetermined direction under the influence of an electric field generated by the voltage applied between the electrodes, at the voltage-applied time. For example, at the voltage-applied time, the optical axis AX2 may intersect or be orthogonal to (or be substantially orthogonal to) the substrate 61, as illustrated in FIG. 6 and FIG. 7. In other words, the optical axis AX2 is displaced in a direction in which an angle formed by the optical axis AX2 and the normal line of the substrate 61 is reduced (i.e. the optical axis AX2 is upright) by application of the voltage applied between the electrodes. At this moment, the optical axis AX2 intersects, is orthogonal to, or is substantially orthogonal to the optical axis AX1, and also intersects, is orthogonal to, or is substantially orthogonal to the substrate 61.

Next, a change in diffusion characteristics when the magnitude of a voltage applied to the optical modulation layer 64 is switched will be described. When a voltage is applied between the partial electrode 62A and the upper electrode 66, the optical modulation layer 64 forms the diffusion region 60B shaped like a stripe and extending in a direction parallel to the partial electrode 62A. It is to be noted that when the upper electrode 66 is made of the plurality of partial electrodes 66A, the optical modulation layer 64 forms the diffusion region 60B shaped like a plurality of blocks arranged in a direction parallel to the partial electrode 62A. At this moment, the diffusion region 60B shaped like the plurality of blocks arranged in the direction parallel to the partial electrode 62A is equivalent to the diffusion region 60B shaped like a single strip, from a macroscopic viewpoint.

The optical modulation layer 64 exhibits different diffusion characteristics between when the voltage of Va=V1 is applied and when the voltage of Va=V2 is applied. The optical modulation layer 64 is configured to be able to switch wide-angle diffusion intensity and front diffusion intensity of light emitted from the backlight 20, by switching of the magnitude of the voltage applied between the electrodes.

Figure 9:
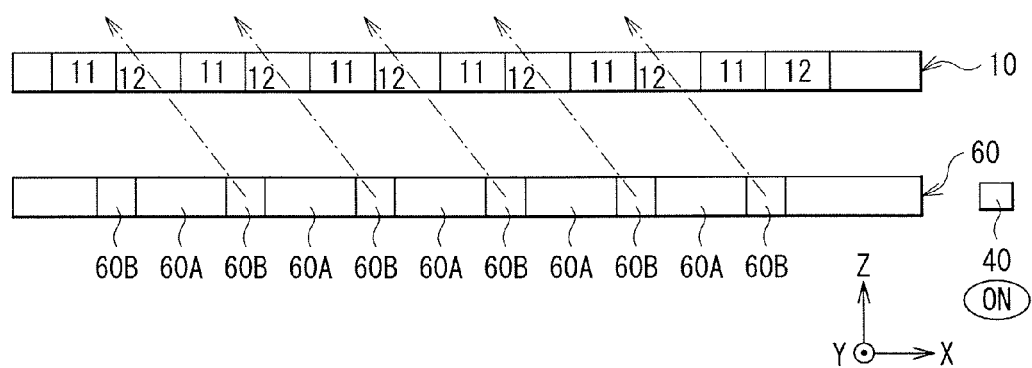
FIG. 9 is a diagram illustrating an example of diffusion distribution in a dual-view mode.
Figure 10:
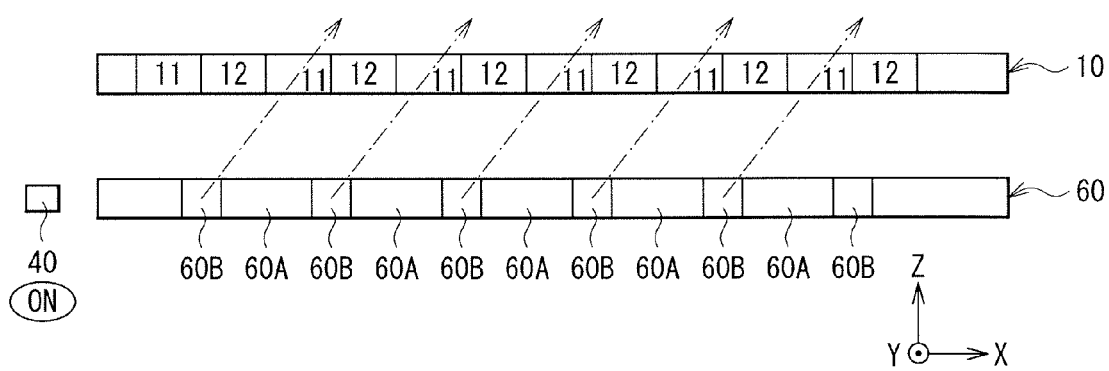
FIG. 10 is a diagram illustrating another example of diffusion distribution in the dual-view mode.

Specifically, the optical modulation layer 64 has the following configuration. As illustrated in FIG. 9, when the voltage (Va=V1) is applied between the partial electrodes 62B and the upper electrode 66, diffusion intensity of light, which goes out from the diffusion region 60B when light from the light source 40 disposed on the side face on the front right side enters the diffusion region 60B, has a peak in a direction of the display pixel 12 facing the other diffusion region 60B next thereto on the front left side, or in a direction having an angle larger than the direction of the display pixel 12. Further, the optical modulation layer 64 has the following configuration. As illustrated in FIG. 10, when the voltage (Va=V1) is applied between the partial electrodes 62B and the upper electrode 66, diffusion intensity of light, which goes out from the diffusion region 60B when light from the light source 40 disposed on the side face on the front left side enters the diffusion region 60B, has a peak in a direction of the display pixel 11 facing the other diffusion region 60B next thereto on the front right side, or in a direction having an angle larger than the direction of the display pixel 11.

Figure 11A:
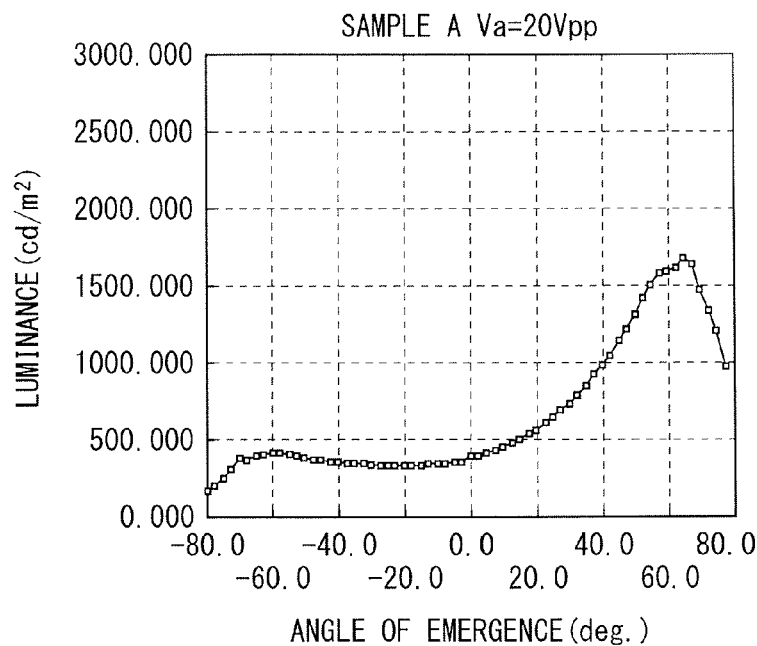
FIG. 11A is a diagram illustrating an example of diffusion properties of a diffusion region in FIG. 9 or FIG. 10.
Figure 11B:
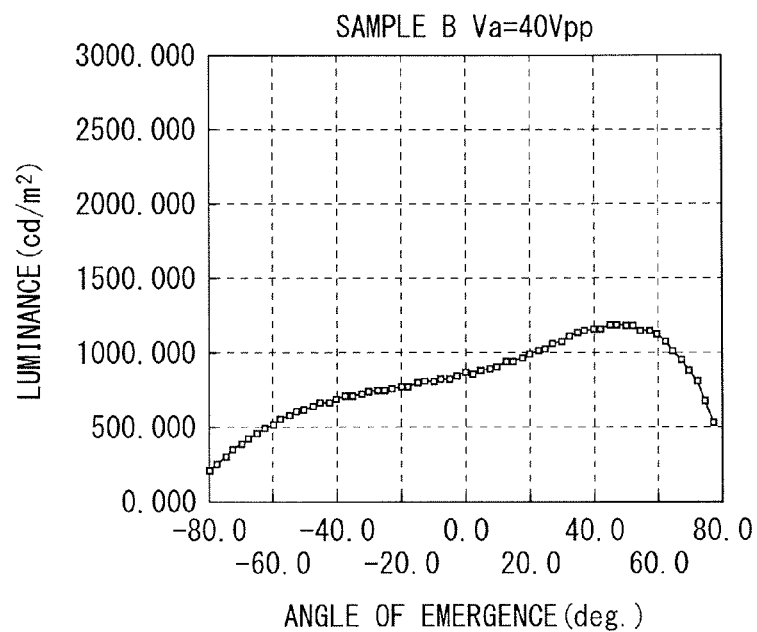
FIG. 11B is a diagram illustrating another example of diffusion properties of the diffusion region in FIG. 9 or FIG. 10.

FIG. 11A illustrates an example of the diffusion intensity of the light going out from the diffusion region 60B, when the voltage (Va=V1) by which the optical modulation layer 64 exhibits the diffusion is applied between the partial electrode 62A and the upper electrode 66 (or the partial electrode 66A), and the light is emitted from only one of the light sources 40. In the example of the diffusion intensity illustrated in FIG. 11A, the above-described pitch is about 1 μm. FIG. 11B illustrates an example of the diffusion intensity when the above-described pitch is less than 1 μm (specifically, about 0.5 μm). FIG. 11A and FIG. 11B each illustrate luminance of a polarized component parallel to the transmission axis of the polarizing plate on the backlight 20 side. In FIG. 11A, a diffusion intensity ratio (wide-angle diffusion intensity/front diffusion intensity) of light going out from the diffusion region 60B (or the backlight 20) is about 3. On the other hand, in FIG. 11B, the above-described diffusion intensity ratio is about 1.5. Therefore, preferably, the above-described diffusion intensity ratio may be 3 or more.

For example, the drive circuit 30 may control the magnitude of a voltage applied between the pair of electrodes (the partial electrode 62A and the partial electrode 66A) of each of the optical modulation cells 60a and 60b, so that the optical axis AX2 of the liquid crystal region 64B in the optical modulation cell 60a is parallel or substantially parallel to the optical axis AX1 of the polymer region 64A, and further, the optical axis AX2 of the liquid crystal region 64B in the optical modulation cell 60b intersects or is orthogonal to the optical axis AX1 of the polymer region 64A. Further, the drive circuit 30 may control the magnitude of a voltage applied between the pair of electrodes (the partial electrode 62A and the partial electrode 66A) of each of the optical modulation cells 60a and 60b, so that the optical axis AX2 of the liquid crystal region 64B in each of the optical modulation cells 60a and 60b intersects or is orthogonal to the optical axis AX1 of the polymer region 64A. In other words, the drive circuit 30 is capable of making the directions of the optical axes AX1 and AX2 of the polymer region 64A and the liquid crystal region 64B agree (or substantially agree) with each other, or different from each other (or orthogonal to each other).

Figure 12:
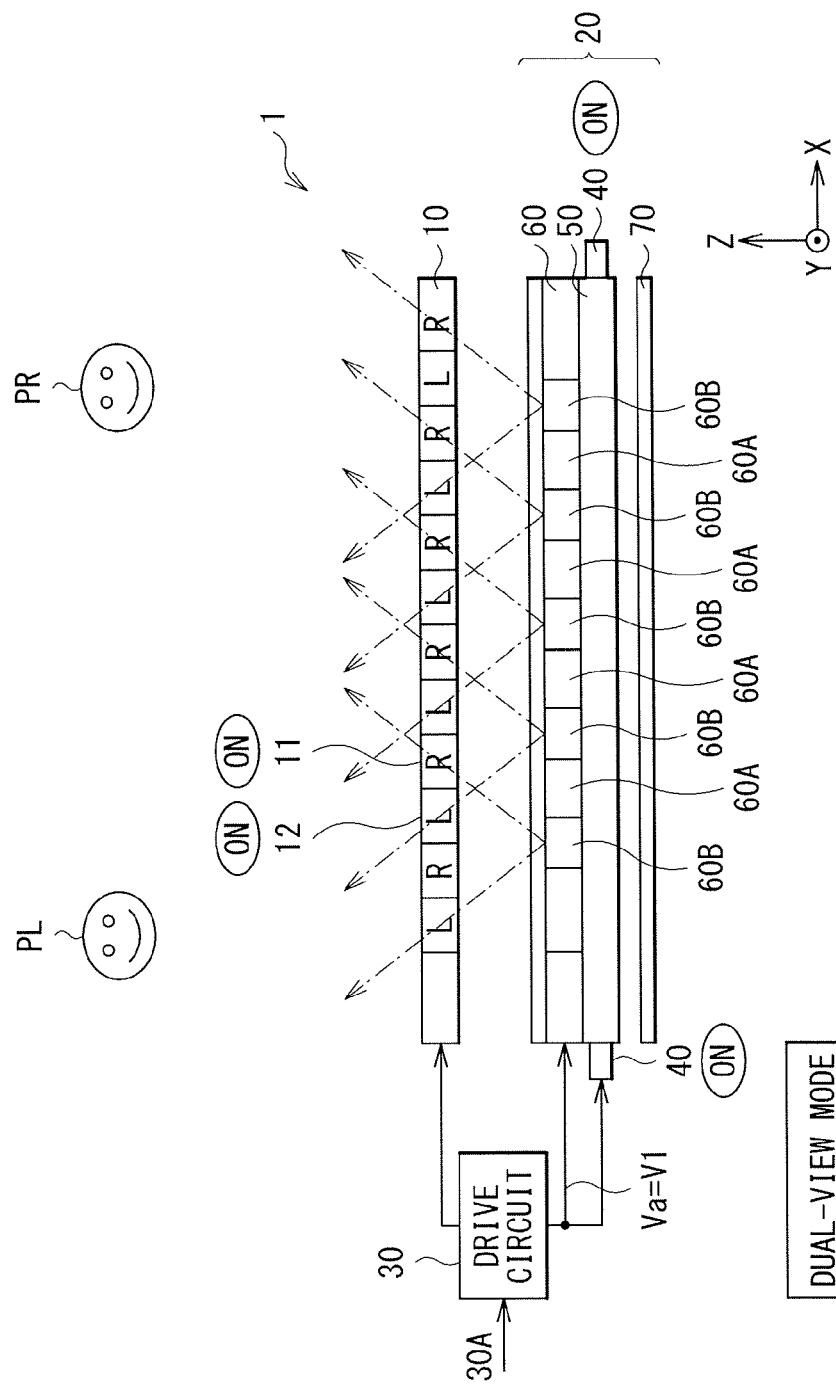
FIG. 12 is a diagram illustrating an example of a dual-view mode.

The drive circuit 30 causes the backlight 20 to output a plurality of linear illumination rays of light, when a signal designating the dual-view mode is inputted as a the control signal 30A. Specifically, the drive circuit 30 applies the voltage (Va=V1) by which the optical modulation layer 64 exhibits the diffusion, between the partial electrode 62B and the upper electrode 66 (or the partial electrode 66A), and also applies the voltage by which the optical modulation layer 64 exhibits the transparency, between the partial electrode 62C and the upper electrode 66 (or the partial electrode 66A). Further, at this moment, the drive circuit 30 turns on both of the two light sources 40. Thus, the optical modulation cell 60b including the partial electrode 62B becomes the diffusion region 60B shaped like a stripe, and the optical modulation cell 60a including the partial electrode 62C becomes the transparent region 60A shaped like a stripe. As a result, for example, as illustrated in FIG. 12, light may be emitted from the diffusion region 60B, in a direction of the display pixel 12 facing the other diffusion region 60B next thereto on the front left side, and in a direction of the display pixel 11 facing the other diffusion region 60B next thereto on the front right side. At this moment, when the drive circuit 30 turns on the display pixels 11 and 12, a left-side viewer PL views an image formed by the display pixels 12, and a right-side viewer PR views an image formed by the display pixels 11. The drive circuit 30 is allowed to realize dual viewing by making the image viewed by the left-side viewer PL and the image viewed by the right-side viewer PR different from each other.

Figure 13:
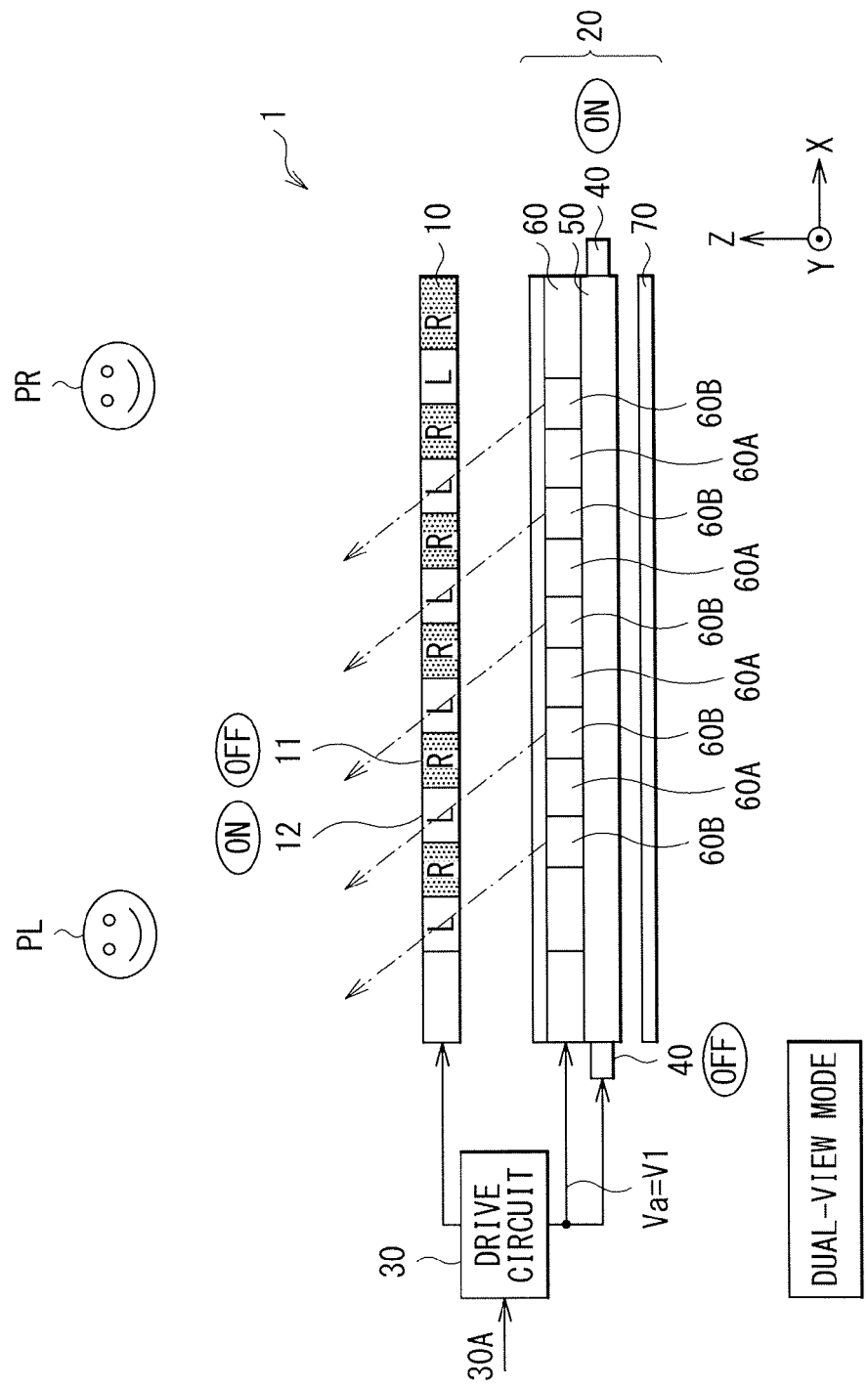
FIG. 13 is a diagram illustrating another example of a dual-view mode.
Figure 14:
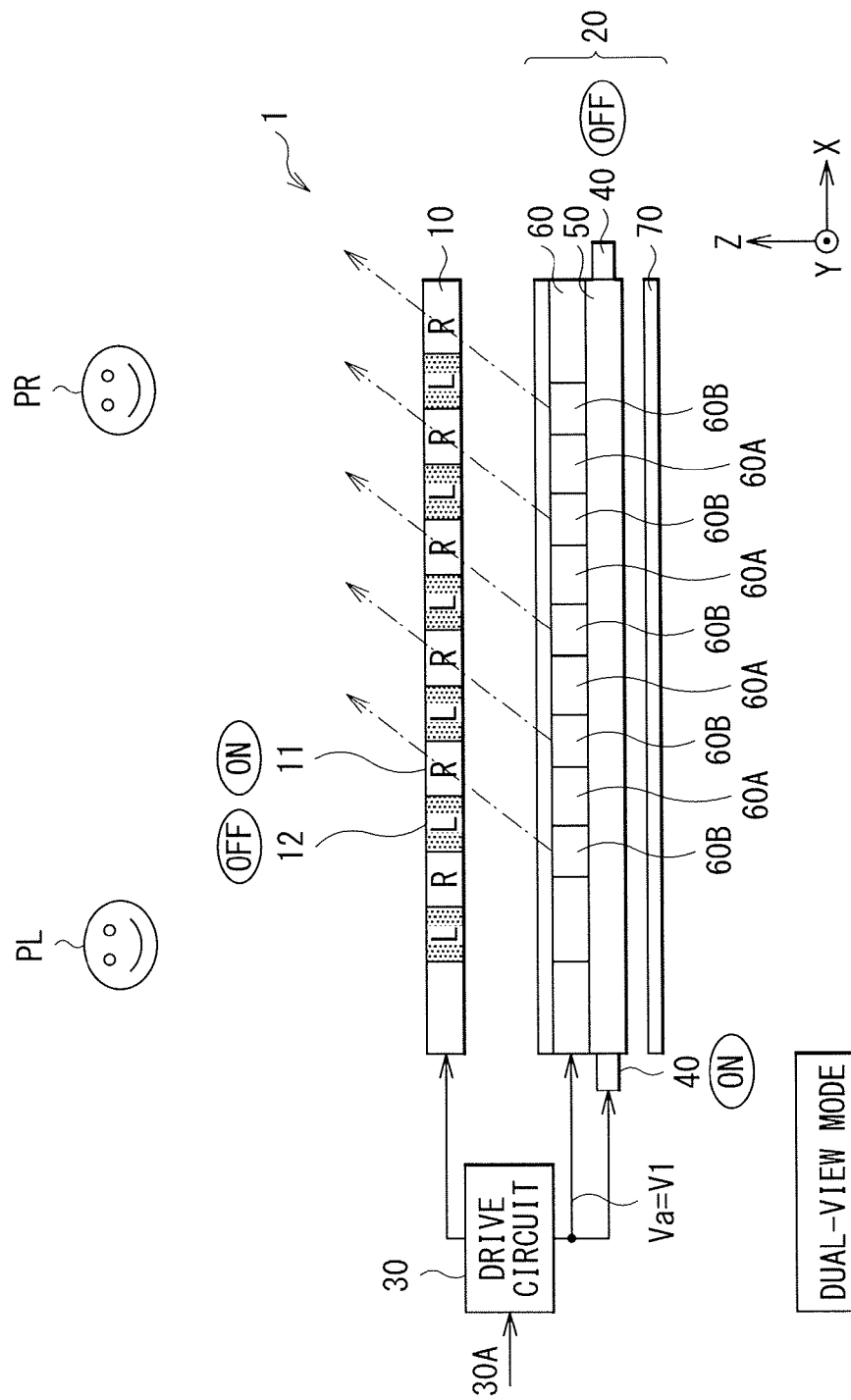
FIG. 14 is a diagram illustrating still another example of a dual-view mode.

When a signal designating the dual-view mode is inputted as the control signal 30A, the drive circuit 30 may switch on and off the two light sources 40 alternately. At this moment, further, the drive circuit 30 may switch on and off each of the display pixels 11 and each of the display pixels 12 alternately. Specifically, in the dual-view mode, the drive circuit 30 turns on the light source 40 disposed on the side face on the front right side and display in each of the display pixels 12, and turns off the light source 40 disposed on the front left side and display in each of the display pixels 11. In this case, for example, the left-side viewer PL may be allowed to view an image formed by each of the display pixels 12, while the right-side viewer PR may not be allowed to view an image at this moment because light is not emitted from the display pixels 11, as illustrated in FIG. 13. Subsequently, in the dual-view mode, the drive circuit 30 turns on the light source 40 disposed on the side face on the front left side and display in each of the display pixels 11, and turns off the light source 40 disposed on the front right side and display in each of the display pixels 12. In this case, for example, the right-side viewer PR may be allowed to view an image formed by each of the display pixels 11, while the left-side viewer PL may not be allowed to view an image at this moment because light is not emitted from the display pixels 12, as illustrated in FIG. 14. The drive circuit 30 is allowed to realize dual viewing, by repeating these processes alternately.

It is to be noted that when the above-described diffusion intensity ratio (wide-angle diffusion intensity/front diffusion intensity) is not so high, the drive circuit 30 may preferably realize dual viewing by the latter processes (the processes illustrated in FIG. 13 and FIG. 14), from the viewpoint of preventing crosstalk in the dual viewing.

Figure 15:
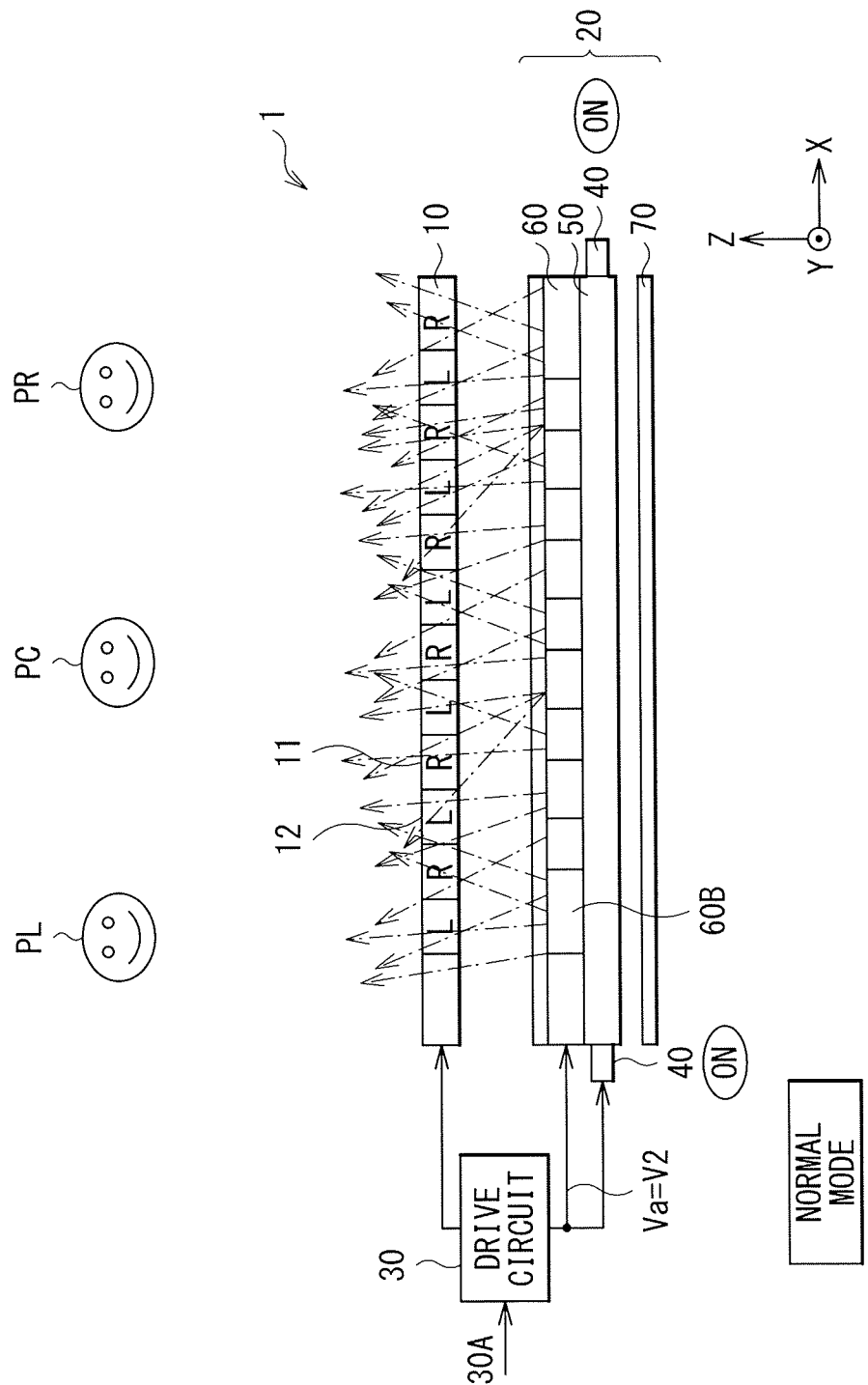
FIG. 15 is a diagram illustrating an example of a normal mode.

When a signal designating the normal mode is inputted as the control signal 30A, the drive circuit 30 causes the backlight 20 to output planar illumination light. Specifically, the drive circuit 30 applies the voltage (Va=V2) by which the optical modulation layer 64 exhibits the diffusion, between the partial electrode 62A and the upper electrode 66 (or the partial electrode 66A). At this moment, further, the drive circuit 30 turns on both of the two light sources 40. Thus, the entire optical modulation layer 64 becomes the diffusion region 60B. As a result, for example, the light close to Lambert may be outputted from the entire optical modulation layer 64, as illustrated in FIG. 15. In this case, when the drive circuit 30 turns on display in the display pixels 11 and 12, the left-side viewer PL, the left-side viewer PR, and a viewer in the front direction (a front viewer PC) are allowed to view a common image formed by the display pixels 11 and 12. Therefore, the drive circuit 30 is allowed to perform switching from the dual-view mode to the normal mode, and switching from the normal mode to the dual-view mode, by switching the magnitude of the voltage applied between the electrodes.

Figure 16A:
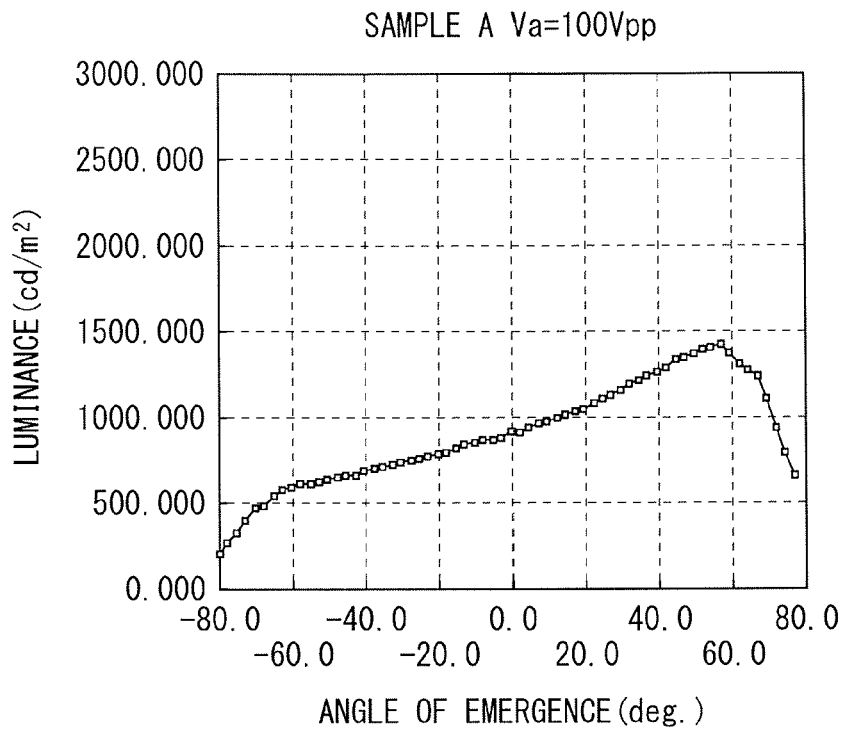
FIG. 16A is a diagram illustrating an example of diffusion properties of a diffusion region in FIG. 15.
Figure 16B:
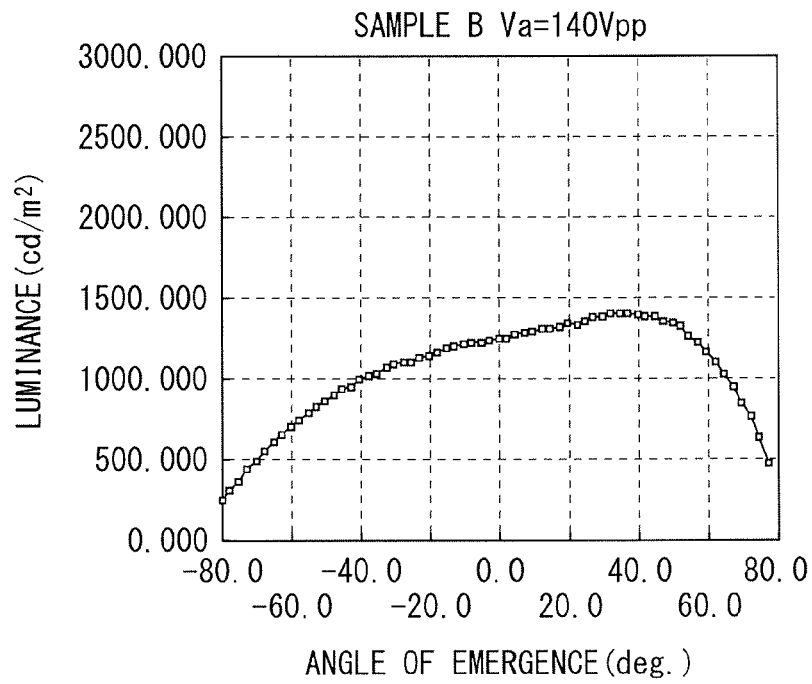
FIG. 16B is a diagram illustrating another example of diffusion properties of the diffusion region in FIG. 15.

FIG. 16A illustrates an example of the diffusion intensity of light going out from the diffusion region 60B, when the voltage (Va=V2) by which the optical modulation layer 64 exhibits the diffusion is applied between the partial electrode 62A and the upper electrode 66 (or the partial electrode 66A), and light is emitted from only one of the light sources 40. In the example of the diffusion intensity in FIG. 16A, the average pitch in the minor-axis direction of the stripe-shaped structure, the porous structure, or the bar-like structure in the polymer region 64A is about 1 µm. FIG. 16B illustrates the example of the diffusion intensity, when the above-described pitch is less than 1 µm (specifically, about 0.5 µm). FIG. 16A and FIG. 16B each illustrate luminance of a polarized component parallel to the transmission axis of the polarizing plate on the backlight 20 side. In FIG. 16A, the above-described diffusion intensity ratio is reduced from about 1.5 to about 3.0. On the other hand, in FIG. 16B, the above-described diffusion intensity ratio is reduced from about 1.5 to a value slightly larger than 1. Therefore, preferably, a variation in the above-described diffusion intensity ratio may be 1.5 or more.

In this way, the drive circuit 30 applies the voltage by which the above-described diffusion intensity ratio becomes relatively large, between the electrodes, in the dual-view mode, and applies the voltage by which the above-described diffusion intensity ratio becomes relatively small, between the electrodes, in the normal mode. When performing switching from the normal mode to the dual-view mode, the drive circuit 30 is allowed to make the above-described diffusion intensity ratio become higher than that in the normal mode, by switching the magnitude of the voltage applied between the electrodes. Further, when performing switching from the dual-view mode to the normal mode, the drive circuit 30 is allowed to make the above-described diffusion intensity ratio become lower than that in the dual-view mode, by switching the magnitude of the voltage applied between the electrodes.

It is to be noted that in the above-description, "turning on display in the display pixels 11 and 12" refers to application of a signal voltage according to an image signal to the pixel electrodes. Further, "turning off display in the display pixels 11 and 12" refers to application of a reference voltage (a fixed voltage) irrelevant to an image signal to the pixel electrode.

Next, functions and effects of the display 1 of the present embodiment will be described.

In the display 1 of the present embodiment, the diffusion intensity ratio in the dual-view mode is increased to become higher than that in the normal mode, by switching the magnitude or the like of the voltage applied between the electrodes. In this way, in the present embodiment, the dual-view mode is achievable by switching the diffusion intensity ratio in the optical modulation layer 64 and thus, a parallax barrier may not be necessarily used to realize the dual-view mode. Further, in the present embodiment, switching from the dual-view mode to the normal mode and switching from the normal mode to the dual-view mode are allowed by switching the diffusion intensity ratio in the optical modulation layer 64. Therefore, in the present embodiment, there is no structural factor that obstructs switching of the modes. Accordingly, dual viewing at high-luminance is allowed be performed. Besides, switching from the dual viewing to the image display in the front direction and switching from the image display in the front direction to the dual viewing are also allowed.

2. Modifications

First Modification

In the above-described embodiment, the light modulation device 60 is adhered to the light-guiding plate 50. However, for example, the light modulation device 60 may be joined to the top surface of the light-guiding plate 50 in intimate contact therewith, without air space therebetween, or may be provided inside. Alternatively, for example, the light modulation device 60 may be joined to the back surface (undersurface) of the light-guiding plate 50 in intimate contact therewith, without air space therebetween.

Second Modification

Figure 17:
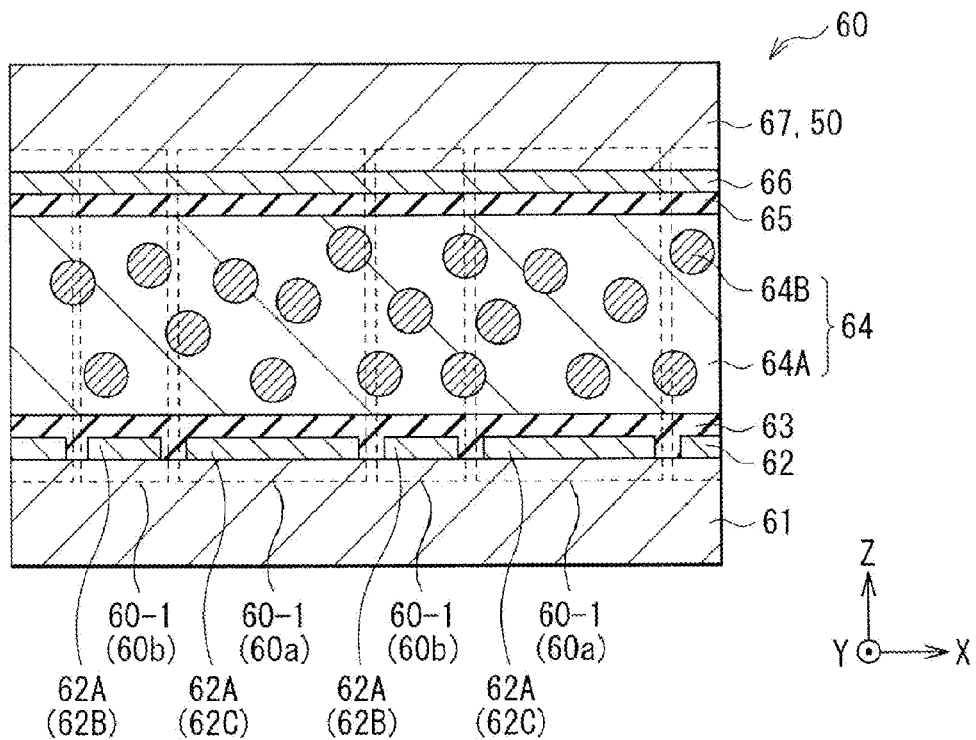
FIG. 17 is a cross-sectional diagram illustrating a first modification of a configuration of the backlight in FIG. 1.
Figure 18:
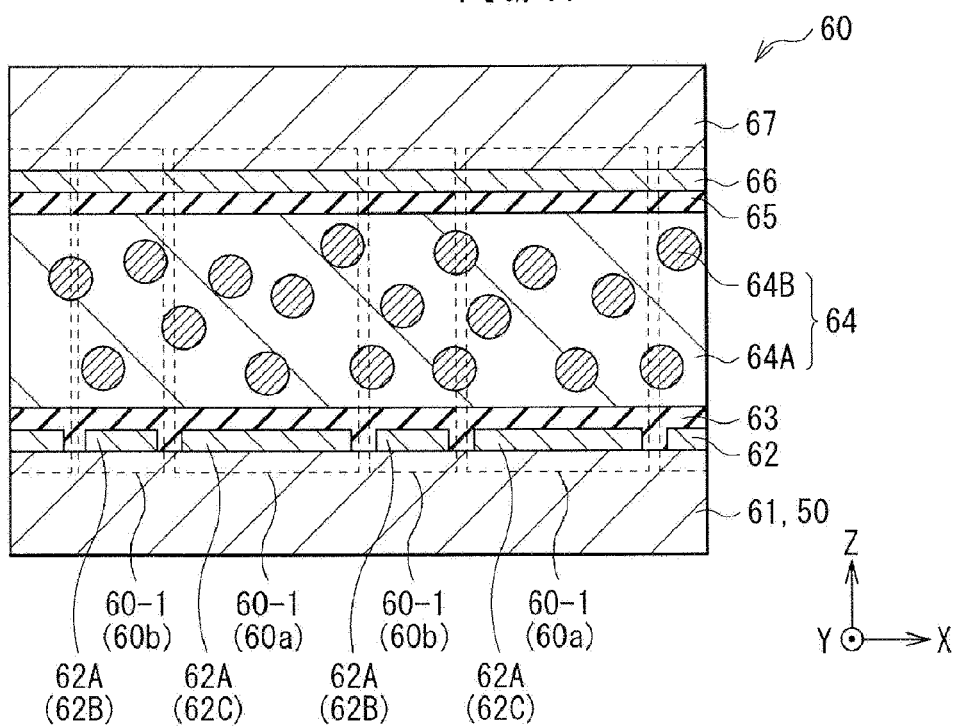
FIG. 18 is a cross-sectional diagram illustrating a second modification of a configuration of the backlight in FIG. 1.
Figure 19:
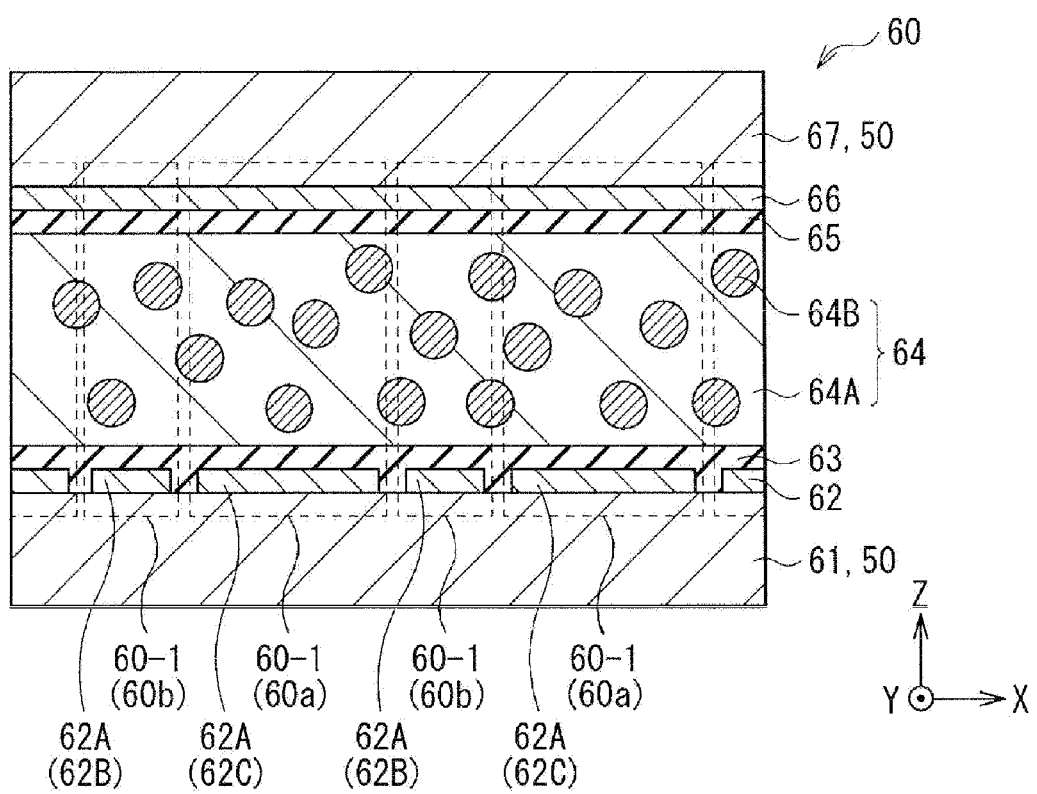
FIG. 19 is a cross-sectional diagram illustrating a third modification of a configuration of the backlight in FIG. 1.

Further, in the above-described embodiment and the modification thereof, one or both of the substrate 61 and the substrate 67 may be formed integrally with the light-guiding plate 50. For example, in the above-described embodiment and the modification thereof, when the substrate 67 is in contact with the light-guiding plate 50, the substrate 67 may be formed integrally with the light-guiding plate 50, as illustrated in FIG. 17. In this case, the substrate 67 is equivalent to a specific but not limitative example of "substrate" in one embodiment of the present application. Further, for example, in the above-described embodiment and the modification thereof, when the substrate 61 is in contact with the light-guiding plate 50, the substrate 61 may be formed integrally with the light-guiding plate 50, as illustrated in FIG. 18. In this case, the substrate 61 is equivalent to a specific but not limitative example of "substrate" in one embodiment of the present application. Furthermore, for example, in the above-described embodiment and the modification thereof, when the substrates 61 and 67 are both in contact with the light-guiding plate 50, the substrates 61 and 67 may be formed integrally with the light-guiding plate 50, as illustrated in FIG. 19. In this case, the substrate 61 and the substrate 67 are equivalent to a specific but not limitative example of "substrate" in one embodiment of the present application.

Furthermore, the technology encompasses any possible combination of some or all of the various embodiments described herein and incorporated herein.

It is possible to achieve at least the following configurations from the above-described example embodiments of the disclosure.

(1) A display, including:
 a display panel configured to display an image;
 an illumination unit configured to illuminate the display panel; and a driving unit configured to drive the display panel and the illumination unit, the illumination unit including a pair of light transmissive substrates separated away from each other and disposed to oppose each other, two light sources one of which is disposed on a side face on a front right side of one of the pair of light transmissive substrates, and the other of which is disposed on a side face on a front left side of the one of the pair of light transmissive substrates, an optical modulation layer provided in space between the pair of light transmissive substrates, and configured to exhibit diffusion or transparency for light from each of the two light sources according to a magnitude of an electric field, and an electrode configured to generate the electric field in the optical modulation layer upon application of a voltage, wherein the optical modulation layer is configured to switch a wide-angle diffusion intensity and a front diffusion intensity of light emitted from the illumination unit, by switching of a magnitude of the voltage applied to the electrode, and wherein the driving unit is configured to allow a diffusion intensity ratio of the light emitted from the illumination unit in a dual-view mode to be higher than the diffusion intensity ratio in a normal mode by switching the magnitude of the voltage applied to the electrode, the dual-view mode being a mode in which respective two-dimensional images different from each other for a perspective on a front right side and a perspective on a front left side are displayed, and the normal mode being a mode in which a common two-dimensional image for any perspectives including a perspective in a front direction is displayed, and the diffusion intensity ratio is defined as dividing the wide-angle diffusion intensity by the front diffusion intensity.

(2) The display according to (1), wherein the display panel includes a plurality of pixels arranged two-dimensionally, the plurality of pixels include a plurality of first pixels and a plurality of second pixels, the plurality of first pixels being configured to display the two-dimensional image for the perspective on the front right side, and the plurality of second pixels being configured to display the two-dimensional image for the perspective on the front left side, the plurality of first pixels and the plurality of second pixels are disposed alternately in a direction in which the two light sources are opposed, the electrode includes a plurality of partial electrodes that extend in a direction intersecting the opposing direction of the two light sources, and a plurality of specific partial electrodes among the plurality of partial electrodes are each disposed at a position that opposes a border between one of the first pixels and one of the second pixels.

(3) The display according to (1) or (2), wherein the optical modulation layer is configured to form diffusion regions by application of a voltage to the partial electrodes, the diffusion regions each have a shape of a strip and extending in a direction parallel to the partial electrodes, the optical modulation layer is configured to allow a diffusion intensity of light, which goes out from one of the diffusion regions upon entrance of the light from the light source disposed on the side face on the front right side into that one of the diffusion regions, to have a peak in a direction of one of the second pixels facing another diffusion region next to that one of the diffusion regions on the front left side, or in a direction having an angle larger than the direction of one of the second pixels, and the optical modulation layer is configured to allow a diffusion intensity of light, which goes out from one of the diffusion regions upon entrance of the light from the light source disposed on the side face on the front left side into that one of the diffusion regions, to have a peak in a direction of one of the first pixels facing another diffusion region next to that one of the diffusion regions on the front right side, or in a direction having an angle larger than the direction of one of the first pixels.

(4) The display according to any one of (1) to (3), wherein the optical modulation layer includes a first region and a second region, the first region having an optical anisotropy and a relatively higher speed of response to the electric field, and the second region having an optical anisotropy and a relatively lower speed of response to the electric field, the second region has a stripe-shaped structure or a porous structure extending in a direction intersecting the opposing direction of the two light sources, and the stripe-shaped structure or the porous structure has a pitch of about 1 μm or more and about 5 μm or less.

(5) The display according to (3) or (4), wherein the driving unit turns on and off the two light sources alternately in the dual-view mode, and turns on both of the two light sources in the normal mode.

(6) The display according to (3) or (4), wherein the driving unit turns on and off each of the first pixels and each of the second pixels alternately in the dual-view mode, and turns on each of the pixels in the normal mode.

(7) The display according to (3) or (4), wherein the driving unit turns on both of the two light sources and each of the pixels in both of the dual-view mode and the normal mode, and the driving unit applies a voltage by which the diffusion intensity ratio is made relatively larger to the electrode in the dual-view mode, and applies a voltage by which the diffusion intensity ratio is made relatively smaller to the electrode in the normal mode.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display, comprising:
a display panel configured to display an image;
an illumination unit configured to illuminate the display panel; and
a driving unit configured to drive the display panel and the illumination unit,
the illumination unit including
a pair of light transmissive substrates separated away from each other and disposed to oppose each other,
two light sources including a first light source disposed on a side face on a front right side of one of the pair of light transmissive substrates, and a second light source disposed on a side face on a front left side of the one of the pair of light transmissive substrates,
an optical modulation layer provided in space between the pair of light transmissive substrates, and configured to exhibit diffusion or transparency for light from each of the two light sources according to a magnitude of an electric field, and
an electrode configured to generate the electric field in the optical modulation layer upon application of a voltage, wherein the optical modulation layer is configured to switch a wide-angle diffusion intensity and a front diffusion intensity of light emitted from the illumination unit, by switching of a magnitude of the voltage applied to the electrode, wherein the driving unit is configured to allow a diffusion intensity ratio of the light emitted from the illumination unit in a dual-view mode to be higher than the diffusion intensity ratio in a normal mode by switching the magnitude of the voltage applied to the electrode, the dual-view mode being a mode in which respective two-dimensional images different from each other for a perspective on a front right side and a perspective on a front left side are displayed, and the normal mode being a mode in which a common two-dimensional image for any perspectives including a perspective in a front direction is displayed, and the diffusion intensity ratio is defined as dividing the wide-angle diffusion intensity by the front diffusion intensity, wherein the display panel includes a plurality of pixels arranged two-dimensionally, the plurality of pixels include a plurality of first pixels and a plurality of second pixels, the plurality of first pixels being configured to display the two-dimensional image for the perspective on the front right side, and the plurality of second pixels being configured to display the two-dimensional image for the perspective on the front left side, the plurality of first pixels and the plurality of second pixels are disposed alternately in a direction in which the two light sources are opposed, the electrode includes a plurality of partial electrodes that extend in a direction intersecting the opposing direction of the two light sources, and a plurality of specific partial electrodes among the plurality of partial electrodes are each disposed at a position that opposes a border between one of the first pixels and one of the second pixels, and wherein the optical modulation layer is configured to form diffusion regions by application of a voltage to the partial electrodes, the diffusion regions each have a shape of a strip and extending in a direction parallel to the partial electrodes, the optical modulation layer is configured to allow a diffusion intensity of light, which goes out from one of the diffusion regions upon entrance of the light from the light source disposed on the side face on the front right side into that one of the diffusion regions, to have a peak in a direction of one of the second pixels facing another diffusion region next to that one of the diffusion regions on the front left side, or in a direction having an angle larger than the direction of one of the second pixels, and the optical modulation layer is configured to allow a diffusion intensity of light, which goes out from one of the diffusion regions upon entrance of the light from the light source disposed on the side face on the front left side into that one of the diffusion regions, to have a peak in a direction of one of the first pixels facing another diffusion region next to that one of the diffusion regions on the front right side, or in a direction having an angle larger than the direction of one of the first pixels.

2. The display according to claim 1, wherein
the optical modulation layer includes a first region and a second region, the first region having an optical anisotropy and a relatively higher speed of response to the electric field, and the second region having an optical anisotropy and a relatively lower speed of response to the electric field, the second region has a stripe-shaped structure or a porous structure extending in a direction intersecting the opposing direction of the two light sources, and the stripe-shaped structure or the porous structure has a pitch of about 1 μm or more and about 5 μm or less.

3. The display according to claim 1, wherein the driving unit turns on and off the two light sources alternately in the dual-view mode, and turns on both of the two light sources in the normal mode.

4. The display according to claim 1, wherein the driving unit turns on and off each of the first pixels and each of the second pixels alternately in the dual-view mode, and turns on each of the pixels in the normal mode.

5. The display according to claim 1, wherein
the driving unit turns on both of the two light sources and each of the pixels in both of the dual-view mode and the normal mode, and the driving unit applies a voltage by which the diffusion intensity ratio is made relatively larger to the electrode in the dual-view mode, and applies a voltage by which the diffusion intensity ratio is made relatively smaller to the electrode in the normal mode.

* * * * *